US011731435B2

(12) United States Patent
Kollata et al.

(10) Patent No.: US 11,731,435 B2
(45) Date of Patent: *Aug. 22, 2023

(54) PRINTER, METHOD OF OPERATING PRINTER, AND SUBSTRATE HANDLING MECHANISM

(71) Applicant: Kateeva, Inc., Newark, CA (US)

(72) Inventors: Eashwer Chandra Vidhya Sagar Kollata, Fremont, CA (US); Digby Pun, San Jose, CA (US); Cormac McKinley Wicklow, Newark, CA (US); Gregory Lewis, Mountain View, CA (US)

(73) Assignee: Kateeva, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,778

(22) Filed: May 17, 2022

(65) Prior Publication Data
US 2022/0274425 A1    Sep. 1, 2022

Related U.S. Application Data

(63) Continuation of application No. 17/248,656, filed on Feb. 2, 2021, now Pat. No. 11,364,731.

(Continued)

(51) Int. Cl.
*B41J 11/00* (2006.01)
*B41J 25/00* (2006.01)
(Continued)

(52) U.S. Cl.
CPC ............. *B41J 11/004* (2013.01); *B41J 3/407* (2013.01); *B41J 13/0009* (2013.01); *B41J 13/10* (2013.01);
(Continued)

(58) Field of Classification Search
CPC ...... B41J 11/004; B41J 3/407; B41J 13/0009; B41J 13/10; B41J 25/001; B65G 49/065; B65G 2207/06
See application file for complete search history.

(56) References Cited

U.S. PATENT DOCUMENTS

| 11,364,731 | B2 * | 6/2022 | Kollata | ................. B41J 11/004 |
| 2004/0263544 | A1 * | 12/2004 | Kojima | ................... B41J 3/407 |
| | | | | 347/5 |

(Continued)

OTHER PUBLICATIONS

International Search and Written Opinion dated Apr. 15, 2021 to PCT/US2021/070111.

(Continued)

*Primary Examiner* — Henok D Legesse
(74) *Attorney, Agent, or Firm* — Hauptman Ham, LLP

(57) ABSTRACT

A printer includes a substrate support, a printhead assembly, first and second actuators, and a controller. The printhead assembly deposits material on a substrate supported on the substrate support. The first actuator is disposed at a side of the substrate support and coupled to a first linear track disposed along the side of the substrate support and oriented in a first direction. The second actuator is disposed at an end of the substrate support and coupled to a second linear track disposed along the end of the substrate support and oriented in a second direction perpendicular to the first direction. The first and second actuators are positioned to engage with the substrate simultaneously. The controller moves the first and second actuators together to rotate the substrate.

20 Claims, 15 Drawing Sheets

Related U.S. Application Data

(60) Provisional application No. 62/969,218, filed on Feb. 3, 2020.

(51) Int. Cl.
  *B41J 13/00* (2006.01)
  *B41J 13/10* (2006.01)
  *B41J 3/407* (2006.01)
  *B65G 49/06* (2006.01)

(52) U.S. Cl.
  CPC ........... *B41J 25/001* (2013.01); *B65G 49/065* (2013.01); *B65G 2207/06* (2013.01)

(56) References Cited

U.S. PATENT DOCUMENTS

| | | |
|---|---|---|
| 2010/0089884 A1 | 4/2010 | Sercel et al. |
| 2015/0360462 A1* | 12/2015 | Lowrance ................. B41J 3/28 101/425 |
| 2016/0016423 A1 | 1/2016 | Mauck et al. |
| 2018/0014411 A1* | 1/2018 | Vronsky .............. B41J 13/0027 |
| 2018/0264862 A1 | 9/2018 | Lowrance et al. |

OTHER PUBLICATIONS

Notice of Allowance dated Feb. 24, 2022 in U.S. Appl. No. 17/248,656.

* cited by examiner

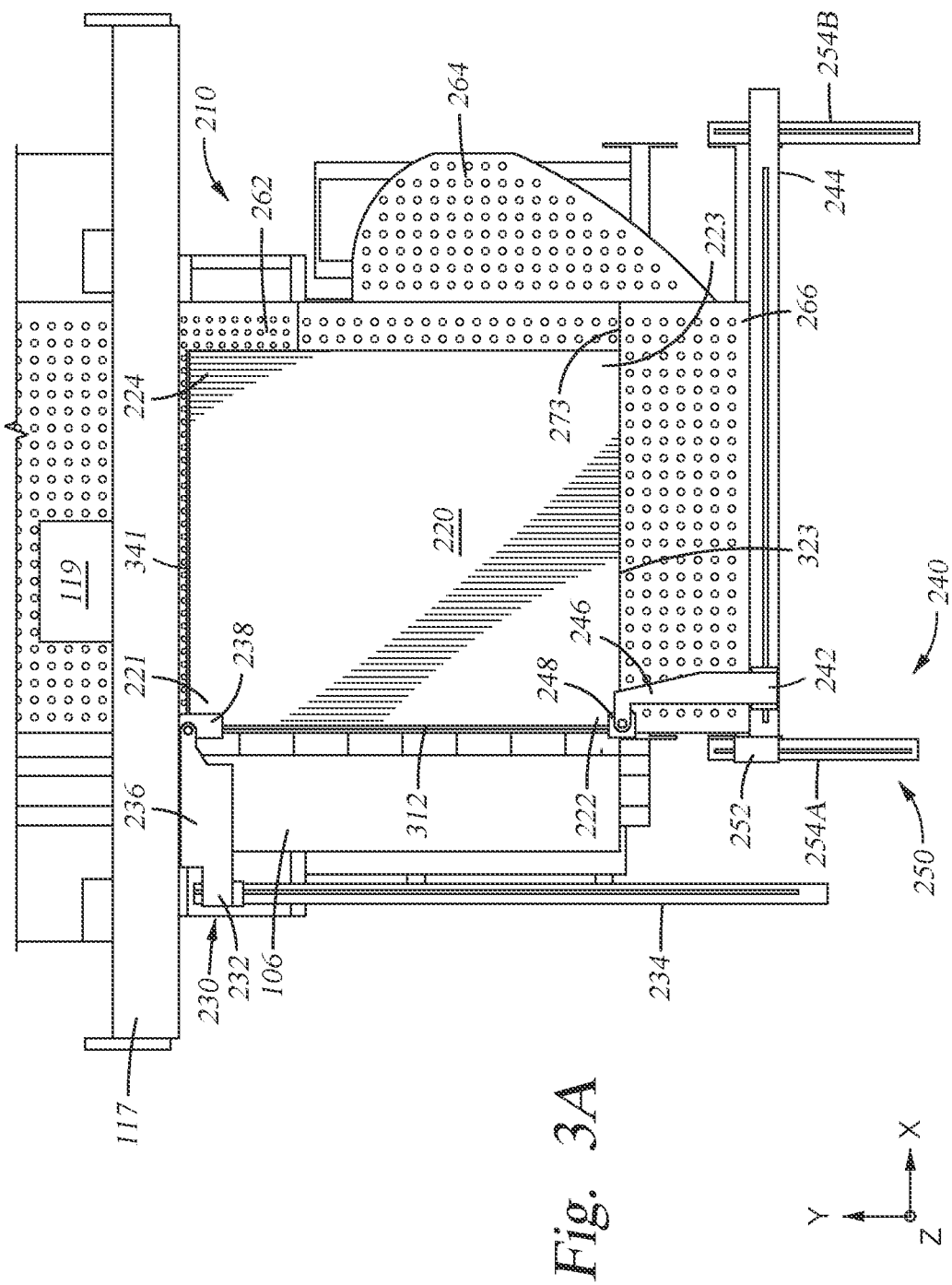

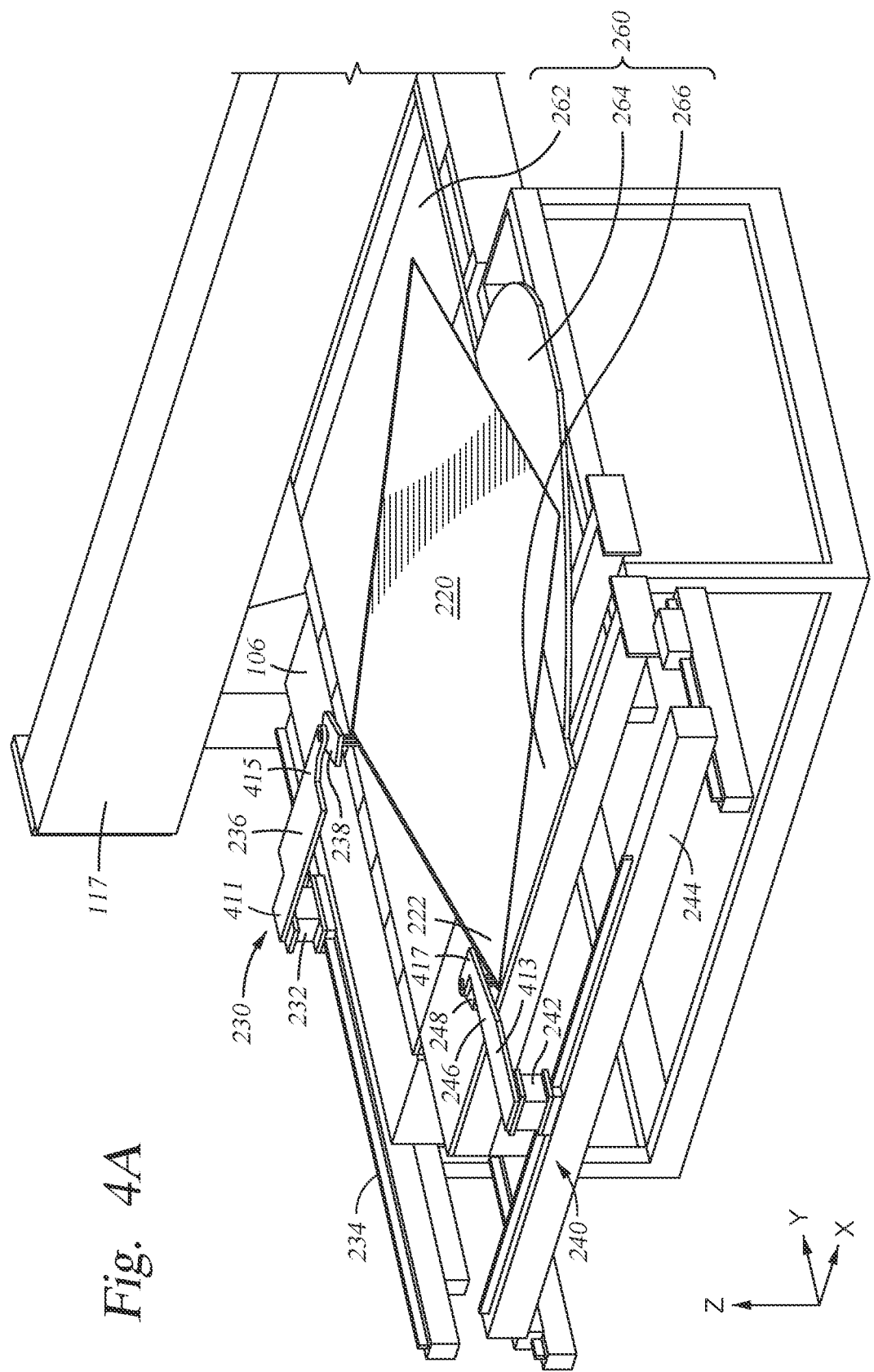

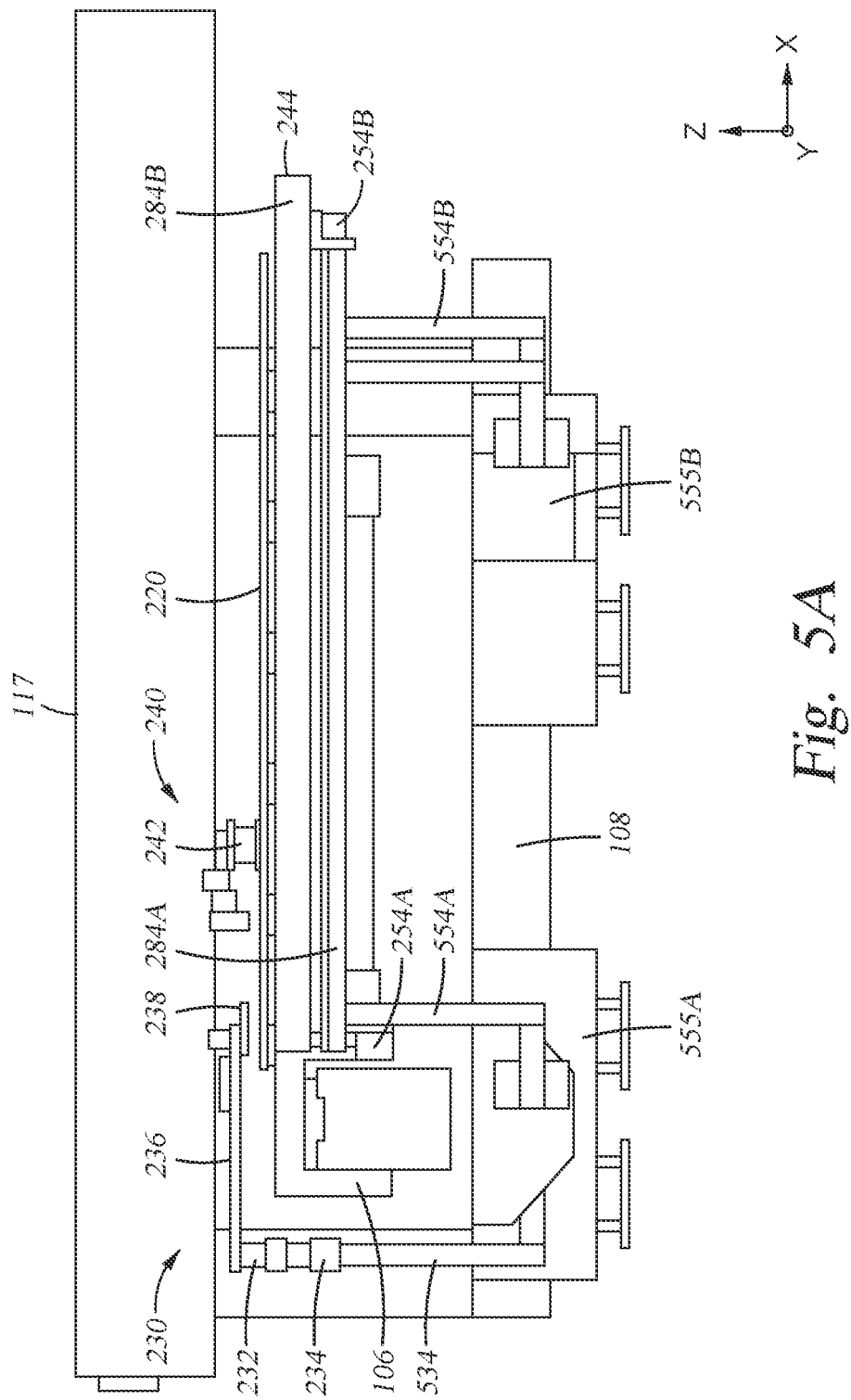

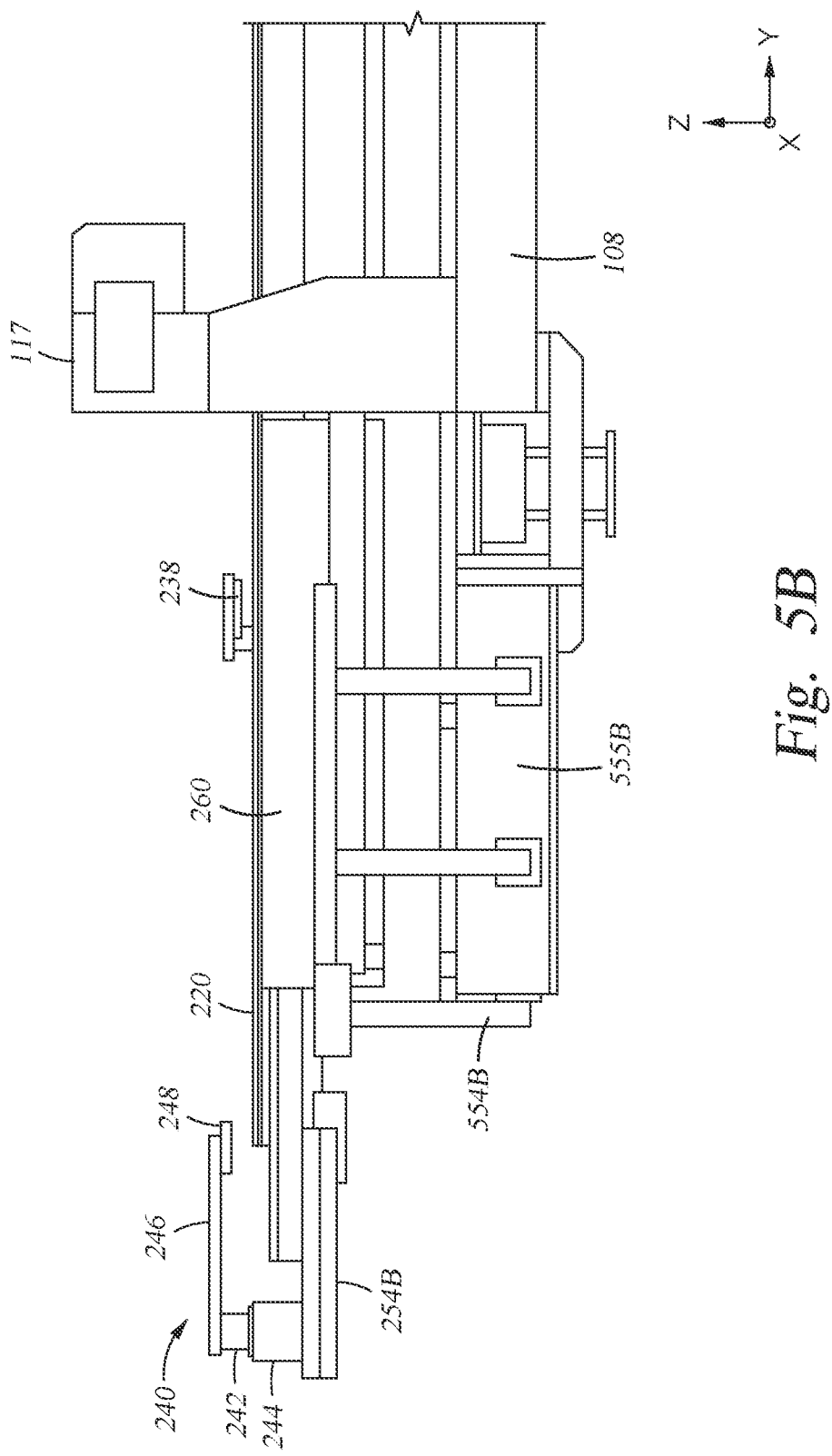

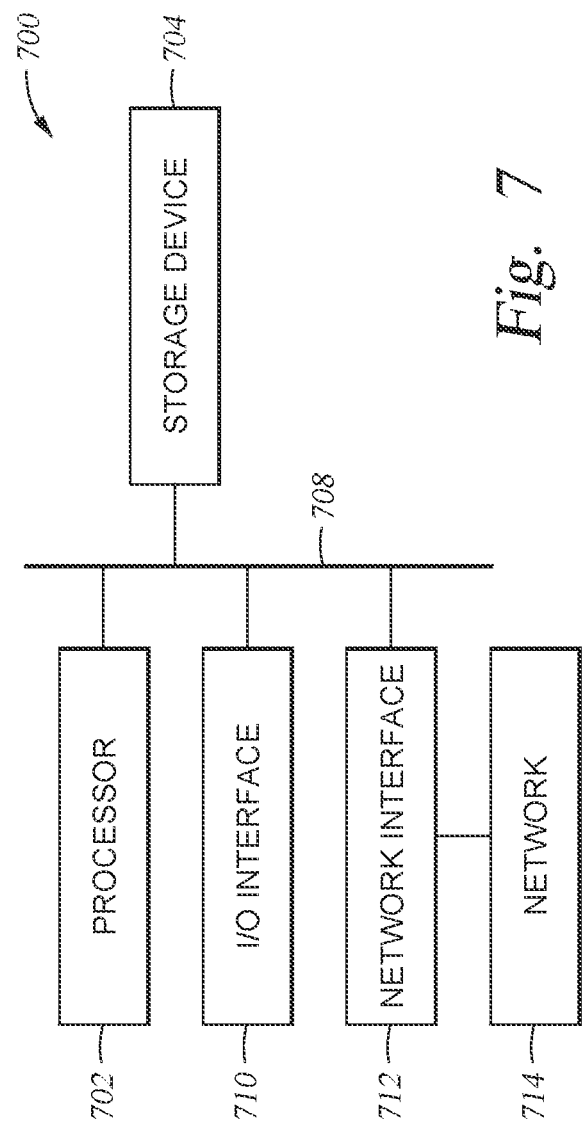

PRINTER, METHOD OF OPERATING PRINTER, AND SUBSTRATE HANDLING MECHANISM

RELATED APPLICATIONS

This application is a continuation of U.S. patent application Ser. No. 17/248,656, filed Feb. 2, 2021, which claims the benefit of the U.S. Provisional Application No. 62/969,218, filed Feb. 3, 2020, the entire disclosure of which is incorporated by reference herein.

FIELD

Embodiments of the present application generally relate to inkjet printing systems. Specifically, methods, systems and/or apparatuses for handling substrates in inkjet printing systems are described.

BACKGROUND

Inkjet printing is common, both in office and home printers and in industrial scale printers used for fabricating displays, printing large scale written materials, adding material to manufactured articles such as PCBs, and constructing biological articles such as tissues. Commercial, industrial and/or consumer inkjet printers use dispensers to apply print material to a substrate. The dispenser ejects a controlled quantity of print material toward a substrate at a controlled time and rate so that the print material arrives at the substrate in a target location and makes a printed feature having a desired size and shape. In some situations, the print material is to be ejected toward the substrate while the substrate is in one orientation, whereas in other situations, the print material is to be ejected toward the substrate while the substrate is in a different orientation. Printing methods and/or systems for handling substrates in different orientations are proposed in this aspect.

SUMMARY

In at least one embodiment, a printer comprises a substrate support, a holder assembly, a printhead assembly, a first actuator, a second actuator, and a controller. The holder assembly is movable relative to the substrate support in a first direction, and configured to hold and translate a substrate in the first direction while the substrate is being supported on the substrate support. The printhead assembly is movable relative to the substrate support in a second direction transverse to the first direction, and configured to deposit a print material on the substrate. The first actuator is movable relative to the substrate support in the first direction, and configured to hold a first portion of the substrate. The second actuator is movable relative to the substrate support in the second direction, and configured to hold a second portion of the substrate. The controller is coupled to the first actuator and the second actuator, and configured to control the first actuator and the second actuator to simultaneously move, in the first direction and the second direction, respectively, to cause a rotation of the substrate, while the substrate is being supported on the substrate support, from a first orientation associated with a first format to a second orientation associated with a second format. The first format is one of a portrait format, having a length in the first direction and a width in the second direction, and a landscape format having the width in the first direction and the length in the second direction. The second format is the other of the portrait format and the landscape format.

In a method of handling a substrate in a printer in accordance with at least one embodiment, a substrate is supported on a substrate support. The substrate is rotated by holding a first portion of the substrate by a first end-effector of a first actuator, holding a second portion of the substrate by a second end-effector of a second actuator, and simultaneously moving the first actuator in a first direction and the second actuator in a second direction transverse to the first direction, to cause a rotation of the substrate from a first orientation associated with a first format to a second orientation associated with a second format. The first format is one of a portrait format, having a length in the first direction and a width in the second direction, and a landscape format having the width in the first direction and the length in the second direction. The second format is the other of the portrait format and the landscape format. The first end-effector is rotatable about a first rotational axis. The second end-effector is rotatable about a second rotational axis different from the first rotational axis. During the rotation of the substrate, the first and second end-effectors are rotated together with the substrate about the first and second rotational axes, respectively.

In at least one embodiment, a substrate handling mechanism for a printer comprises a first actuator, a second actuator, and a controller. The first actuator is movable relative to a substrate support in a first direction. The second actuator is movable relative to the substrate support in a second direction transverse to the first direction. The controller is coupled to the first actuator and the second actuator, and configured to control the first actuator and the second actuator to simultaneously move, in the first direction and the second direction, respectively. At least one of the first actuator or the second actuator comprises: a carriage, and arm, and an end-effector. The carriage is coupled to and movable along a rail which extends along the substrate support in the corresponding first or second direction. The arm extends from the carriage toward the substrate support. The end-effector is pivotably coupled to an end of the arm to be freely rotatable during the simultaneous movement of the first actuator and the second actuator.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A, 3B, 3C, 3D and 3E are schematic top views of a part of a printer at various stages of a substrate rotating operation, in accordance with at least one embodiment.

FIGS. 4A and 4B are perspective views.

FIGS. 5A and 5B are elevational side views of a part of a printer looking in a first direction and a second direction, respectively, in accordance with at least one embodiment.

FIG. 7 is a block diagram of a controller, in accordance with at least one embodiment.

DETAILED DESCRIPTION

Figure 1:
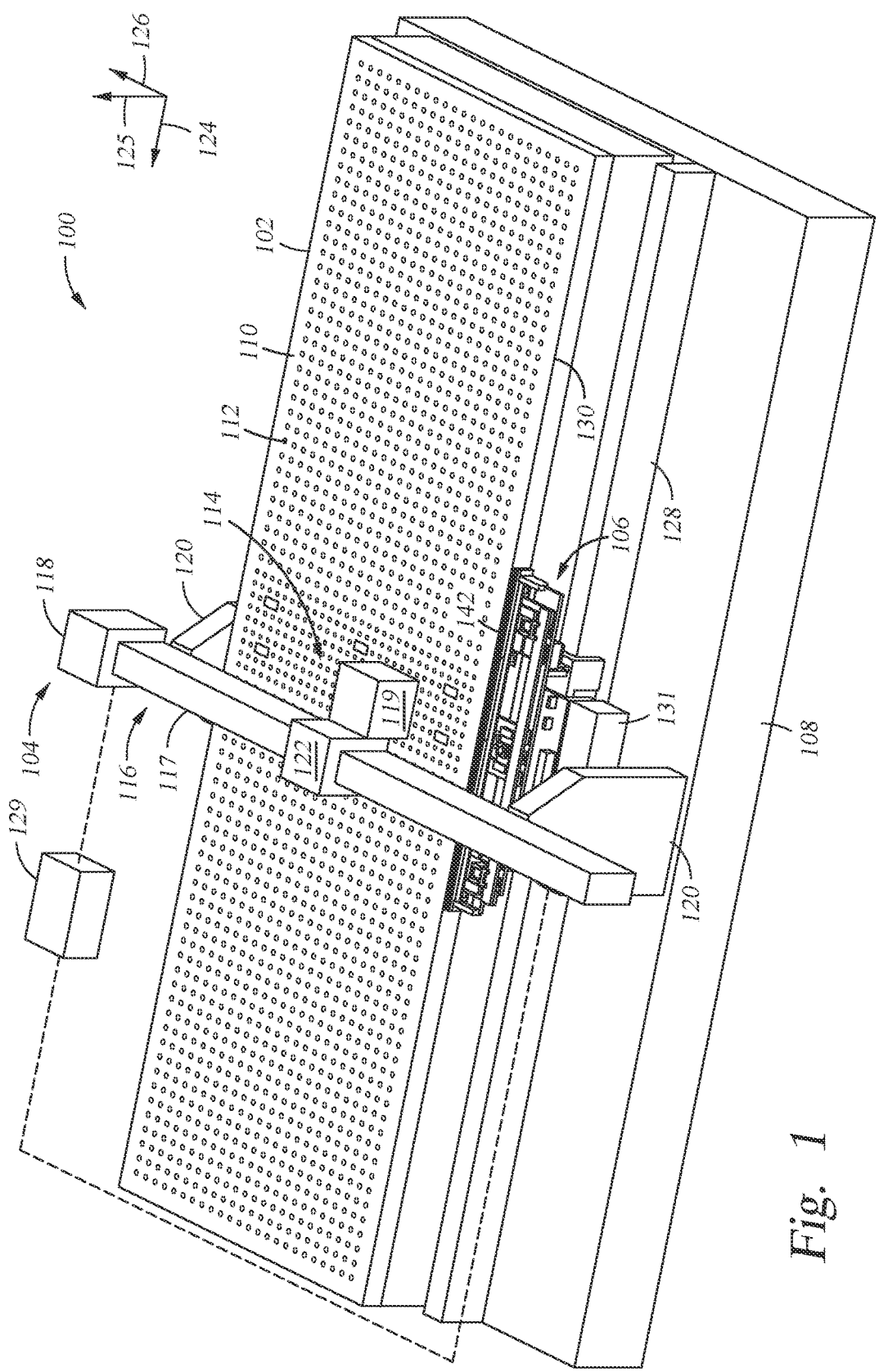
FIG. 1 is a top isometric view of a printer.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top isometric view of a printer 100. The printer 100 has a table 102, a print assembly 104, and a holder assembly 106 for manipulating a substrate for printing. The printer 100 is founded upon a base 108, which is in one example a massive object to minimize vibratory transmissions to the operative parts of the printer 100. In one example, the base 108 is a granite block. The table 102 is located upon the base 108, and comprises a support surface 110 along with a device for making the support surface 110 substantially frictionless. In one example, the support surface 110 provides a gas cushion on which the substrate floats. The support surface 110 features a first plurality of holes 112 that allow jets of gas to exit, thus providing an upward force to maintain a substrate at a desired elevation above the support surface 110. The support surface 110 may also have a second plurality of holes configured to allow controlled withdrawal of gas from the gas cushion floating the substrate to provide precise local control of substrate elevation.

The print assembly 104 comprises a dispenser assembly 114 disposed on a print support 116. The print support 116 is disposed in relation to the table 102 to provide access for the dispenser assembly 114 to position constructively in relation to a substrate on the table 102 to precisely apply print material to the substrate. The print support 116 includes a rail or beam 117 that traverses the table 102, allowing the dispenser assembly 114 to traverse the table 102 and deposit print material at any location on the substrate from one side of the print support 116 to the opposite side thereof. In one example, the print support 116 is attached to the base 108 and extends from the base 108 to provide stable support for the dispenser assembly 114. Two stands 120 extend from the base 108, on opposite sides of the table 102, to the rail 117, which extends across the table 102. In one example, the stands 120 and the rail 117 are both made of the same material as the base 108. In one example, the stands 120, the rail 117, and the base 108 are separate pieces of granite that are bolted together.

The dispenser assembly 114 includes at least one printhead assembly 119 along with a print assembly controller 118 that includes electronics and/or sensors for controlling the functional parameters of the printhead assembly 119 such as location of the printhead assembly 119 along the print support 116, timing, duration, type of print material, and dispensing profile. The printhead assembly 119 is movable along the rail 117 of the print support 116 by operation of a print carriage 122 that couples with the print support 116 to translate the printhead assembly 119 along the rail 117 from one end of the rail 117 to the other opposite end. In one example, the print carriage 122 is driven by a motor or a servomotor. Power and signal conduits are not shown to simplify the figure.

A substrate (not shown in FIG. 1) is positioned under the print assembly 104 by the holder assembly 106. The substrate may be a rigid substrate made of, for example, glass. The holder assembly 106 acquires secure contact with the substrate upon loading, and moves or translates the substrate along the table 102 to position the substrate with respect to the print assembly 104 for dispensing print material onto the substrate in a precise fashion. The holder assembly 106 is located on one side of the table 102 and extends along the table 102 in a first direction to translate the substrate in the first direction during printing. The first direction is denoted in FIG. 1 by arrow 124. The first direction 124 is referred to as the "Y direction". The printhead assembly 119 moves in a second direction substantially transverse to the first direction, guided by the rail 117 which extends substantially in the second direction denoted in FIG. 1 by arrow 126. The second direction 126 is referred to as the "X direction" and the rail 117 as the "X beam." A third direction substantially transverse to the first and second directions is denoted in FIG. 1 by arrow 125. The third direction 125 is referred to as the "Z direction." The X, Y and Z directions are directions of axes of a coordinate system serving as a frame of reference of the printer 100, as illustrated by the arrows 124, 125, and 126. In one example, the origin of the coordinate system is at a fixed point, e.g., associated with the base 108.

The holder assembly 106 is disposed on a holder assembly support 128, which in one example is a rail that extends in the first direction along an edge 130 of the table 102. In one example, the holder assembly support 128 is attached, for example bolted, to the base 108 to provide stable support for the holder assembly 106. In one example, the holder assembly support 128 is made from the same material as the base 108. The holder assembly support 128 is sometimes referred to as the "Y beam." The holder assembly 106 securely holds the substrate, for example, by vacuum or suction force, applied through a plurality of holes of the holder assembly 106, to a plurality of corresponding locations along an edge of the substrate. The vacuum or suction force may be applied to the top side, or the bottom side, or both, of the edge of the substrate. The holder assembly 106 moves along the holder assembly support 128 during operation to position the securely held substrate at any location on the table 102, and the print assembly 104, for example by operation of the print assembly controller 118, positions the printhead assembly 119 to provide access to a precise location on the substrate for dispensing print material.

In the example configuration described above, the holder assembly 106 is depicted as moving the substrate in the first direction 124 while the dispenser assembly 114 moves in the second direction 126 to access all desired portions of the substrate. In other configurations, the dispenser assembly moves in the first and second directions while the substrate is held stationary. In other configurations, the dispenser assembly is held stationary while the substrate is moved in the first and second directions 124 and 126. In still other configurations, the holder assembly and the dispenser assembly both move in the first and second directions 124 and 126. Where the areal coverage of the dispenser assembly is different from the area of the substrate desired for printing, the dispenser assembly and the substrate are relatively moved to accomplish the complete print job.

A system controller 129 receives signals from various sensors deployed throughout the printer 100 and sends signals to various components of the printer 100 to control printing. The system controller 129 is operationally coupled, for example, via a network, to the print assembly controller 118 and to a holder assembly controller 131, which controls operation of the holder assembly 106. One or more of the table 102, the print assembly 104, the holder assembly 106, and other ancillary systems, such as environment control and materials management systems, have sensors operatively coupled to the system controller 129 to transmit signals to the system controller 129 related to the status of various components during a printing operation. The system controller 129 includes data and instructions to determine control signals to send to various controlled components of the printer 100. In at least one embodiment, two or more of the system controller 129, the print assembly controller 118 and the holder assembly controller 131 are integrated into a single controller. In at least one embodiment, at least one of the system controller 129, the print assembly controller 118 and the holder assembly controller 131 is implemented as several controllers distributed in the printer 100 and connected one with another via a network. An example configuration of a controller in accordance with at least one embodiment is described with respect to FIG. 7. For simplicity, in the description below, "controller" refers to any one or more of controllers in the printer 100 and/or any one or more of controllers in a printing system using the printer 100.

In some cases, a particular substrate may have a particular orientation that is most advantageous for performing the designed print job on the substrate. For example, sometimes a substrate is advantageously processed in the "portrait" format, where the substrate is inserted into the printer in a direction parallel to the long dimension (or length) of the substrate, while at other times the substrate is advantageously processed in the "landscape" format, where the substrate is inserted into the printer in a direction parallel to the short dimension (or width) of the substrate. While the printer 100 is capable of handling and performing deposition of print material on substrates in both orientations, i.e., associated with both the landscape format and portrait format, use of other chambers or equipment for post-deposition processing (also referred to herein as post-processing), that support only one orientation frequently requires multiple rotations of the substrate between the deposition process and the post-process, at least where different orientations are needed for the two processes. In complex printing systems including several printers, rotation of the substrate between deposition and post-processing can become undesired where the two processes need different substrate orientations.

In this aspect, a substrate handling mechanism is described herein for rotating a substrate in situ in a printer. In some embodiments, the substrate handling mechanism includes two actuators holding different portions of the substrate and moving in two different directions transverse to each other, while the substrate is being supported by a substrate support in the printer. As a result, it is possible to rotate the substrate in situ in the printer, without requiring a separate chamber or equipment for substrate rotation. Further, a substrate rotated to a landscape orientation for print material deposition may be rotated again, before unloading, back to a portrait orientation for post-processing. This arrangement saves time and increases productivity compared to other approaches where a separate rotation chamber is required before and/or after the printer to rotate a substrate into a desired orientation for print material deposition and/or to rotate a substrate with print material deposited thereon into a desired orientation for post-processing. In this disclosure, references to "portrait orientation" and "landscape orientation" should be understood as referring to an orientation that corresponds to the portrait format and the landscape format, respectively. In this sense, a "portrait orientation" is a substrate orientation that enables processing the substrate in the portrait format and a "landscape orientation" is a substrate orientation that enables processing the substrate in the landscape format.

Figure 2:
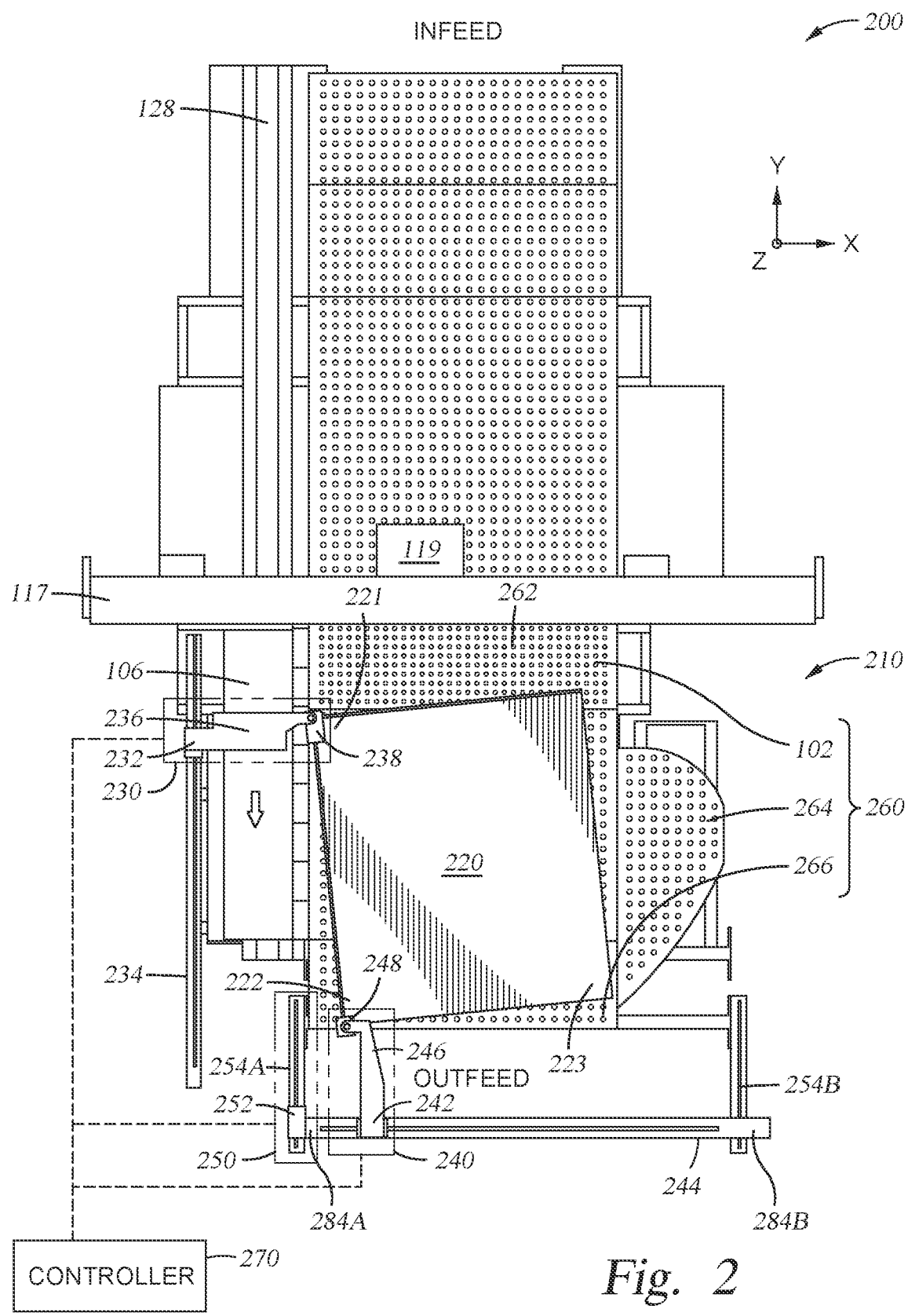
FIG. 2 is a schematic top view of a printer in accordance with at least one embodiment.

FIG. 2 is a schematic top view of a printer 200 in accordance with at least one embodiment. The printer 200 comprises various components similar to those of the printer 100. Some of such components are indicated by the same reference numerals in FIG. 2, while other components are omitted from FIG. 2 to simplify the figure. Compared to the printer 100, the printer 200 comprises a substrate support 260 which includes not only the table 102, but also at least one extension including a first extension 264 and/or a second extension 266. The printer 200 additionally comprises a substrate handling mechanism 210 for rotating a substrate 220. The substrate handling mechanism 210 comprises a first actuator 230, a second actuator 240, an auxiliary actuator 250, and a controller 270.

The first actuator 230 is schematically indicated in FIG. 2. The first actuator 230 is movable relative to the substrate support 260 in a first direction (Y direction) and is configured to hold a first portion 221 of the substrate 220. In the example configuration in FIG. 2, the first actuator 230 comprises a carriage 232 coupled to and movable along a rail (also referred to herein as "linear track") 234, an arm 236 extending from the carriage 232 toward the substrate support 260, and an end-effector 238 pivotably coupled to a distal end of the arm 236. The rail 234 is located outside the footprint of the substrate support 260, and extends along the substrate support 260 in the Y direction from a position adjacent the rail 117 toward an outfeed end or side of the table 102. As opposed to an infeed end or side (indicated by the label "INFEED" in the drawings) where the substrate 220 is delivered to the table 102, the outfeed end or side (indicated by the label "OUTFEED" in the drawings) is where the substrate 220 emerges after a translational movement caused by the holder assembly 106, along the Y direction, from the infeed end and passing under the rail 117. The rail 234 is positioned, in the X direction, opposite the substrate support 260 across the holder assembly 106. In other words, the holder assembly 106 is located, in the X direction, between the rail 234 and the substrate support 260. In one example, the carriage 232 is driven by a motor or a servomotor (not shown) to travel in the Y direction along the rail 234. The arm 236 extends, in the X direction, from the carriage 232 over the holder assembly 106 such that the distal end of the arm 236 is at a position above the substrate support 260. The end-effector 238 extends downward, in the Z direction, from the distal end of the arm 236 toward the substrate support 260 as described with respect to FIGS. 4A-4B below. The end-effector 238 is configured to hold, e.g., by vacuum or suction force, the corresponding first portion 221 of the substrate 220, and to rotate together with the substrate 220 during the rotation of the substrate 200, as described with respect to example embodiments in FIGS. 3A-3E. More detailed views of example embodiments of the first actuator 230 are provided in FIGS. 4A-4C.

The second actuator 240 is schematically indicated in FIG. 2. The second actuator 240 is movable relative to the substrate support 260 in a second direction (X direction) and is configured to hold a second portion 222 of the substrate 220. In the example configuration in FIG. 2, the second actuator 240 comprises a carriage 242 coupled to and movable along a rail 244, an arm 246 extending from the carriage 242 toward the substrate support 260, and an end-effector 248 pivotably coupled to a distal end of the arm 246. The rail 244 located outside the footprint of the substrate support 260, and extends along the substrate support 260 in the X direction, adjacent to the outfeed end or side of the table 102. In one example, the carriage 242 is driven by a motor or a servomotor (not shown) to travel in the X direction along the rail 244. The arm 246 extends, in the Y direction, from the carriage 242 toward the substrate support 260 such that the distal end of the arm 246 can be located at a position above the substrate support 260. The end-effector 248 extends downward, in the Z direction, from the distal end of the arm 246 toward the substrate support 260 as described with respect to FIG. 4A below. The end-effector 248 is configured to hold, e.g., by vacuum or suction force, the corresponding second portion 222 of the substrate 220, and to rotate together with the substrate 220 during the rotation of the substrate 200, as described with respect to example embodiments in FIGS. 3A-3E. More detailed views of example embodiments of the second actuator 240 are provided in FIG. 4A. The described configuration of the first actuator 230 and/or the second actuator 240 is an example, and other configurations are within the scopes of various embodiments. For example, instead of being moveable along a rail, the first actuator 230 or the second actuator 240 may be arranged on a rod that is extended from and retracted into a cylinder structure.

The auxiliary actuator 250 is schematically indicated in FIG. 2. The auxiliary actuator 250 is configured to move the second actuator 240 in the Y direction. In the example configuration in FIG. 2, the auxiliary actuator 250 comprises a carriage 252 coupled to and movable along a rail 254A of a pair of parallel rails 254A and 254B. The rails 254A and 254B extend from a position adjacent the outfeed end of the table 102 and away from the substrate support 260 in the Y direction. The rail 254A is closer to the rail 234 of the first actuator 230 than the rail 254B. The carriage 252 is coupled to an end 284A of the rail 244 of the second actuator 240 that is closer to the first actuator 230. The other end 284B of the rail 244, that is further from the first actuator 230, is supported from below by, and movable along, the other rail 254B. In one example, the carriage 252 coupled to the end 284A of the rail 244 is driven by a motor or a servomotor (not shown) to travel along the rail 254A, causing the other end 284B of the rail 244 to move concurrently on and long the other rail 254B. As result, the second actuator 240 is moved in the Y direction toward or away from the substrate support 260, before and/or after the rotation of the substrate 200, as described herein. In at least one embodiment, the auxiliary actuator 250 is omitted.

Figure 2A:
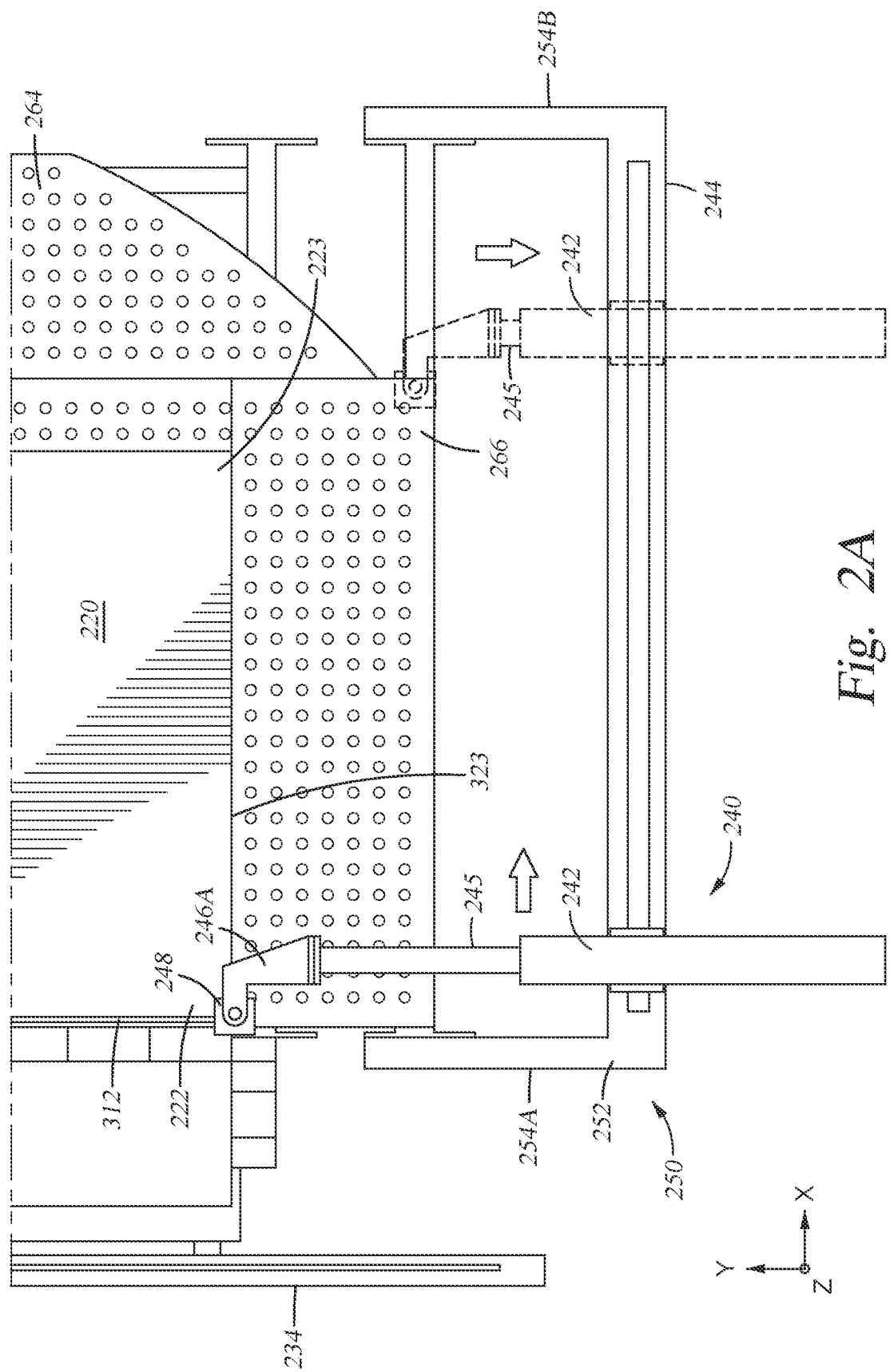
FIG. 2A is a schematic top view of a part of a printer in accordance with at least one alternative embodiment.

FIG. 2A is a schematic top view of a part including the second actuator 240 and the auxiliary actuator 250 of the printer 200, in accordance with at least one alternative embodiment. In the example configuration in FIG. 2A, the rails 254A, 254B and 244 are integrated into a single structure. In other words, unlike the configuration in FIG. 2 where the rail 244 is movable along the rails 254A, 254B, the rail 244 in FIG. 2A is fixed to the rail 254A, 254B. The carriage 242 in FIG. 2A is still movable in the X direction along the rail 244 as in FIG. 2. However, the movement in the Y direction is achieved in FIG. 2A, not by moving the rail 244 along the rails 254A, 254B as in FIG. 2, but by a rod 245 which telescopically extends from and retracts into a cavity (not shown) of the carriage 242. For example, the rod 245 is in an extended state on the left side of FIG. 2A, and is in a retracted state on the right side of FIG. 2A. The extended state of the rod 245 corresponds to a state described herein with respect to FIG. 3A where the end-effector 248 carried by a head 246A at an end of the rod 245 starts to engage with the portion 222 of the substrate 220 before a rotation of the substrate 220. The rod 245 then retracts to the retracted state to move the substrate 220 to a position corresponding to FIG. 3B. The rod 245 remains in the retracted state while the carriage 242 moves along the rail 244 during the rotation of the substrate 220, as described with respect to FIGS. 3B-3D. The rod 245 then extends again to the extended state after the rotation of the substrate 220 to move the substrate 220 to a position corresponding to FIG. 3E.

Returning to FIG. 2, the substrate support 260 is configured to support the substrate 220, at the table 102, during translational movements of the substrate 220 along the Y direction. The substrate support 260 is further configured to support the substrate 220, at a main section 262, first extension 264 and second extension 266, during the rotation of the substrate 220. The main section 262 is a part of the table 102 that is located at an outfeed end of the table 102. The main section 262 is rectangular in shape, and has sufficient length and width to fully support the substrate 220 in any of the landscape orientation and the portrait orientation. The first extension 264 is adjacent, in the X direction, to the main section 262. The first extension 264 has a size and/or a shape sufficient to fully support a third portion 223 of the substrate 220 during the rotation of the substrate 220, as described herein. For this purpose, the first extension 264 in the example configuration in FIG. 2 has a curved and/or slanted edge corresponding to a trajectory of the corresponding corner of the substrate 220 in the third portion 223. However, the described configuration of the first extension 264 is an example, and other configurations are within the scopes of various embodiments. For example, the first extension 264 may have a rectangular shape elongated in the Y direction. The second extension 266 is adjacent, in the Y direction, to the main section 262. The second extension 266 is rectangular in shape, is elongated in the X direction, and has a length in the X direction substantially the same as the width of the main section 262. The second extension 266 has a sufficient size to fully support the second portion 222 of the substrate 220 during the rotation of the substrate 220, as described herein. The second extension 266 is further configured to fully support the third portion 223 of the substrate 220 before the rotation, and the first portion 221 of the substrate 220 after the rotation, as further described below.

Similar to the main section 262 which is part of the table 102, the first extension 264 and second extension 266 include a plurality of holes that allow jets of gas to exit to provide an upward force to maintain the substrate 220 floating at a desired elevation, at least during the rotation of the substrate 220. The first extension 264 and second extension 266 may also have a plurality of gas jet holes configured to allow controlled withdrawal of gas from the gas cushion floating the substrate 220 to provide precise local control of substrate elevation, at least during the rotation of the substrate 220. In at least one embodiment, the gas cushion over the first extension 264 and/or the second extension 266 is generated and/or controlled by the same gas source and/or controller that generates and/or controls the gas cushion over the main section 262 of the table 102. Therefore, a uniform substantially frictionless support of the substrate 220 is achievable during the rotation of the substrate 220. Any one or both of the first extension 264 and second extension 266 may be formed separately from the table 102. For example, both the first extension 264 and the second extension 266 may be formed separately and installed adjacent and in addition to the outfeed end of the table 102 of an existing printer to provide the existing printer with an in situ substrate rotation capability as described herein. Further, any one or both of the first extension 264 and second extension 266 may be an integral part of the table 102. For example, when an existing printer has a sufficiently long table 102 the outfeed end of which can function as both the main section 262 and the second extension 266, only the first extension 264 is needed to be installed adjacent and in addition to the outfeed end of the table 102 to provide the existing printer with an in situ substrate rotation capability as described herein. For another example, both the first extension 264 and the second extension 266 may be formed as integral parts of the table 102.

The controller 270 is coupled to the first actuator 230, second actuator 240 and auxiliary actuator 250 to control operation of the actuators, including, but not limited to, movements of the actuators individually and/or in unison along the respective movement directions, and engagement and/or disengagement of the end-effectors 238, 248 of the first actuator 230 and second actuator 240 with/from the respective portions 221, 222 of the substrate 220. The controller 270 may also be coupled to a gas source (not shown) and control the gas cushion over the substrate support 260. In at least one embodiment, the controller 270 is incorporated in one or more controllers described with respect to FIG. 1. For example, the controller 270 may be incorporated in and implemented by the system controller 129. A substrate rotating operation of the substrate handling mechanism 210 in the printer 200 under control of the controller 270 is described with respect to FIGS. 3A-3E.

Figure 3B:
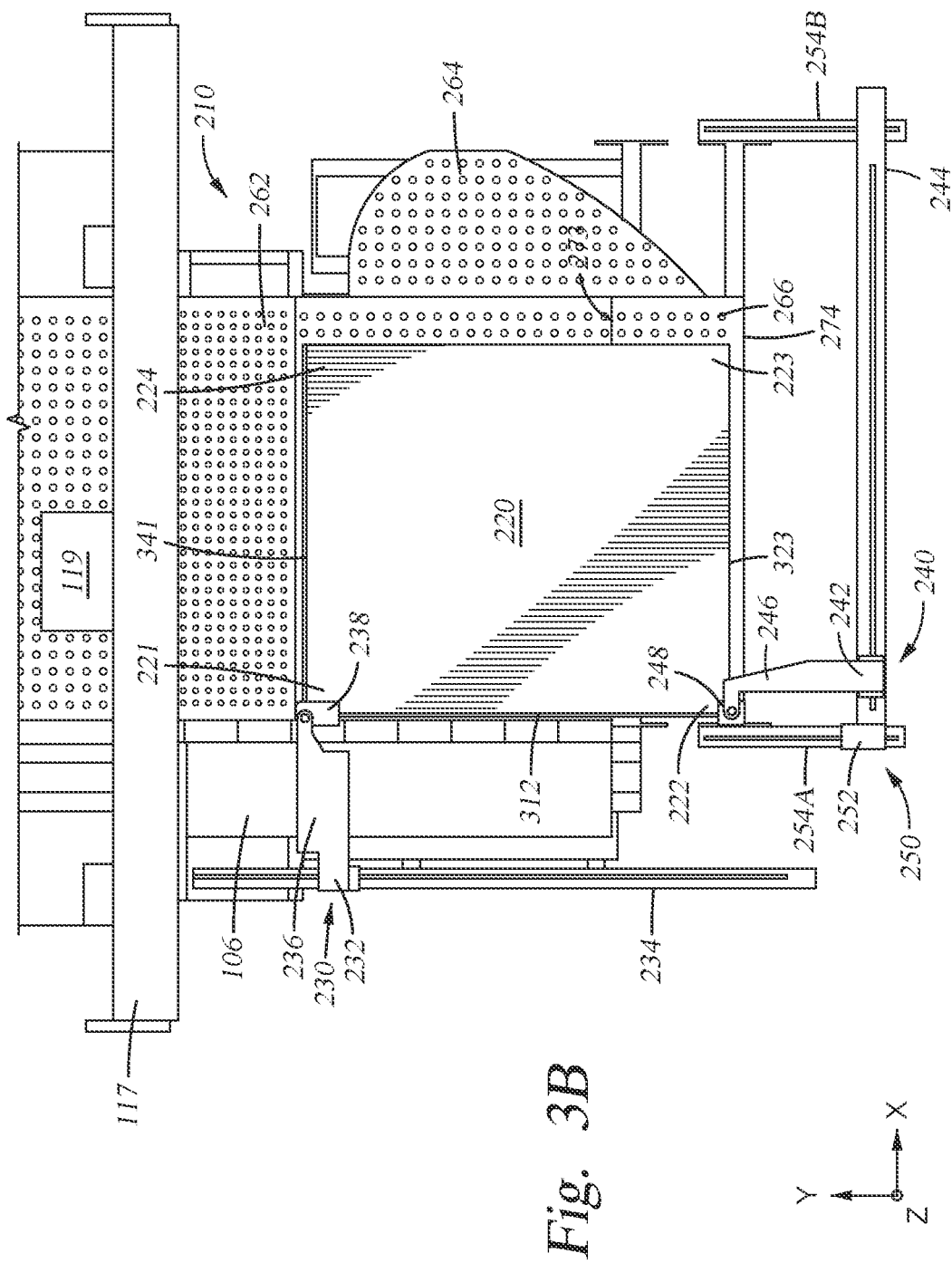
Figure 3C:
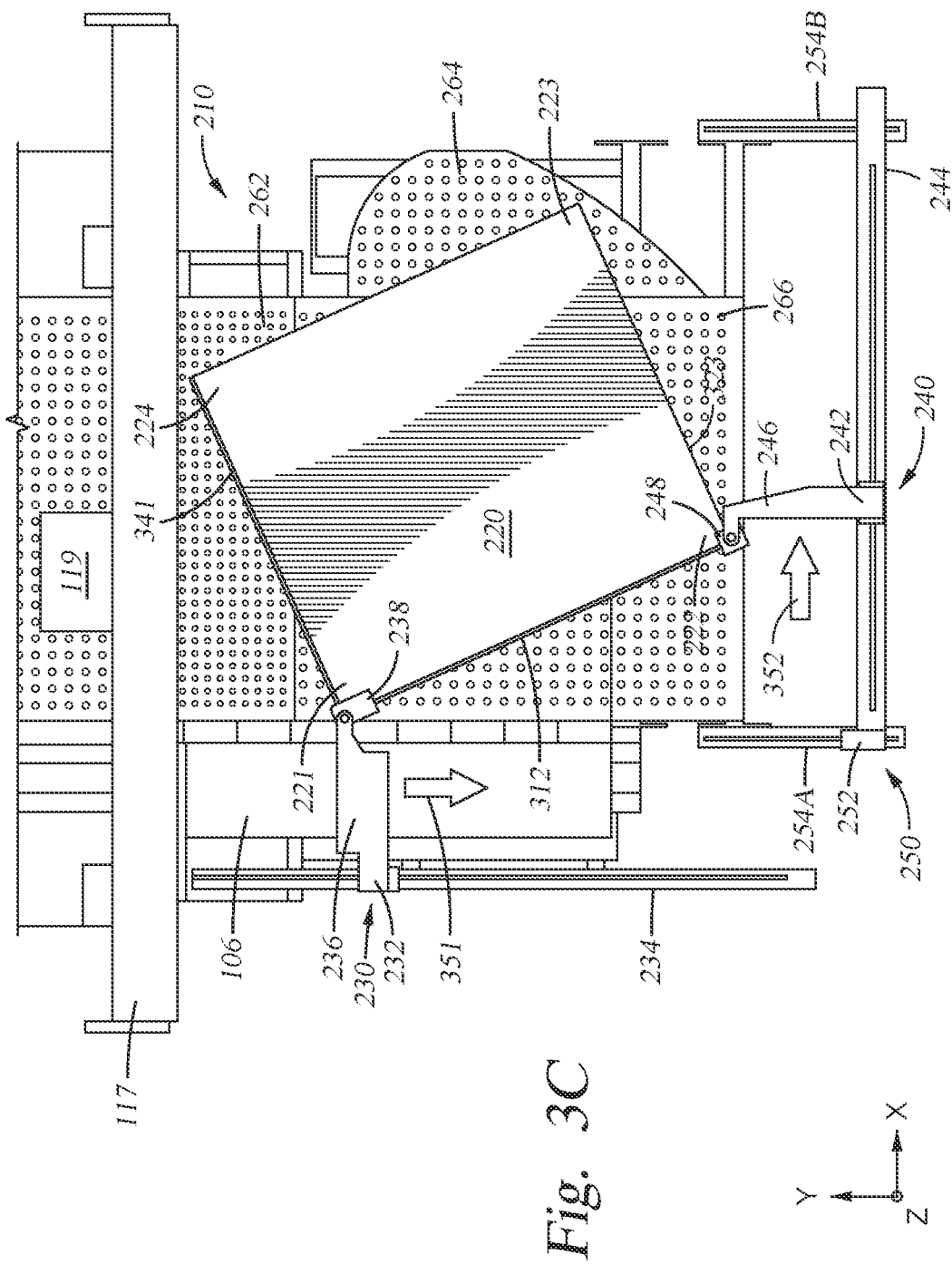
Figure 3D:
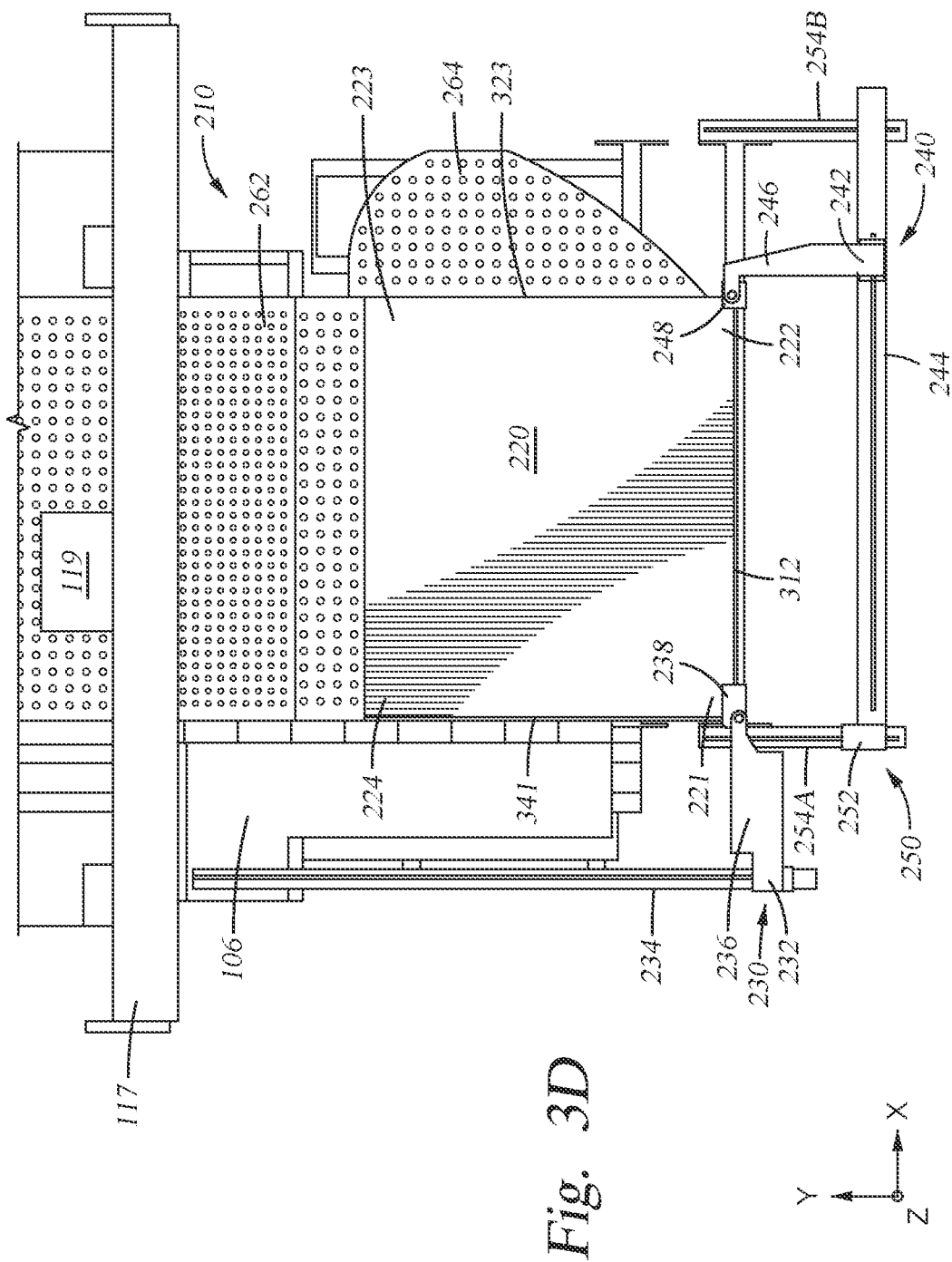
Figure 3E:
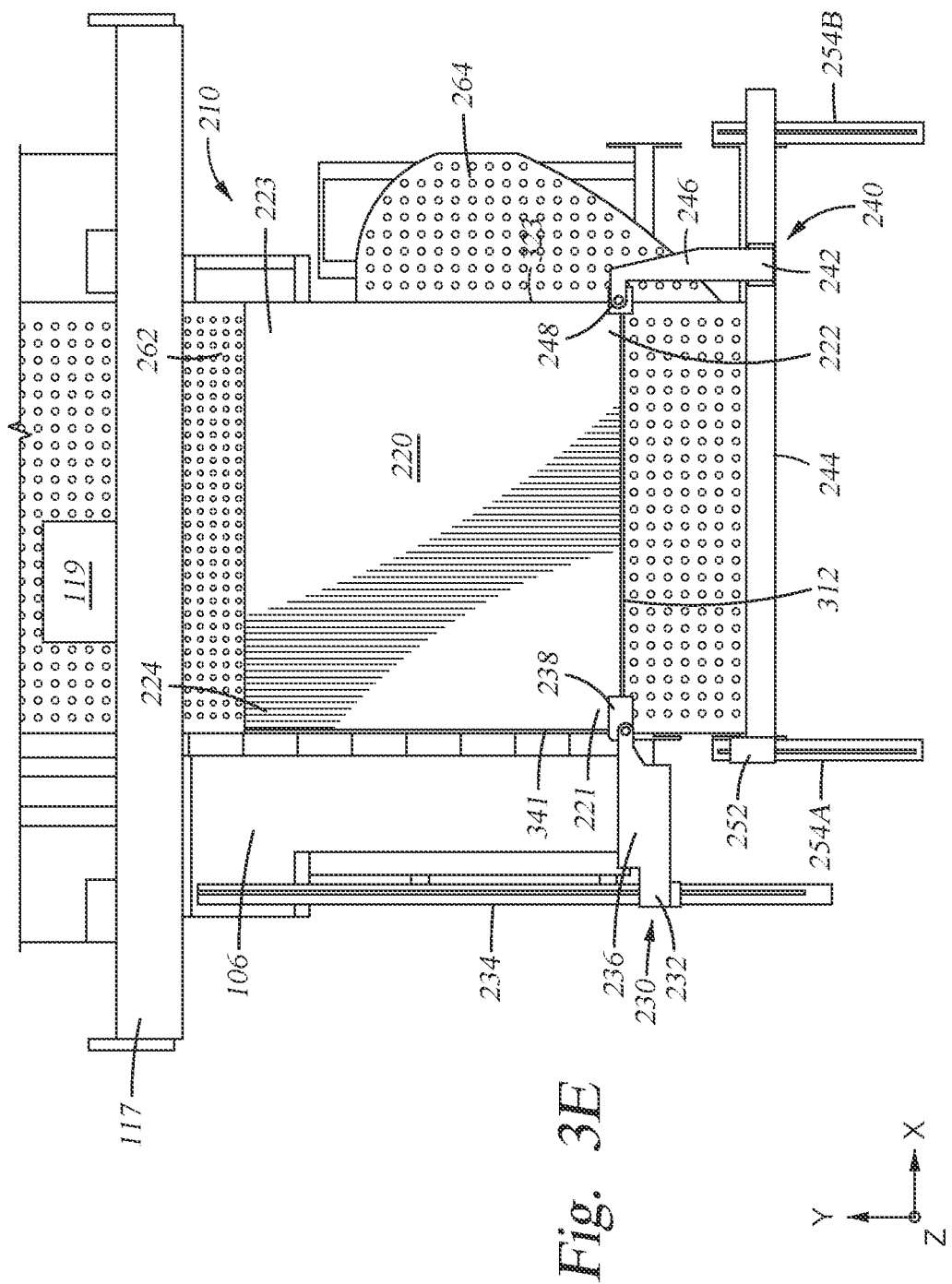

FIGS. 3A-3E are schematic top views of a part of the printer 200 in FIG. 2 at various stages in a substrate rotating operation, in accordance with at least one embodiment. For simplicity, various components of the printer 200 above (i.e., on the infeed side of) the X beam 117 are omitted in FIGS. 3A-3E. FIG. 3A shows the substrate 220 being held over from the holder assembly 106 to the substrate handling mechanism 210 for a substrate rotating operation, FIG. 3B shows the substrate 220 at the beginning of the substrate rotating operation, FIG. 3C shows the substrate 220 during the substrate rotating operation, FIG. 3D shows the substrate 220 at the end of the substrate rotating operation, and FIG. 3E shows the rotated substrate 220 being held over from the substrate handling mechanism 210 back to the holder assembly 106 after the substrate rotating operation. In FIGS. 3A-3E, the substrate rotating operation is performed with the configuration of the second actuator 240 and the auxiliary actuator 250 as described with respect to FIG. 2. The substrate rotating operation can also be performed in a similar manner with the configuration of the second actuator 240 and the auxiliary actuator 250 as described with respect to FIG. 2A.

In at least one embodiment, prior to the state in FIG. 3A, the substrate 220 is delivered in the portrait orientation to the infeed side of the table 102 (best seen in FIG. 2), e.g., by a robot arm (not shown). The holder assembly 106 holds the substrate 220, e.g., by vacuum or suction force, at a plurality of first locations along a first edge 312 of the substrate 220. In FIG. 3A, the substrate is oriented with the first edge 312 extending along the Y direction. The first edge 312 connects the first portion 221 with the second portion 222 of the substrate 220. The holder assembly 106 holding the first edge 312 of the substrate 220 is then moved in the Y direction from the infeed side to the outfeed side to cause a first translation of the substrate 220.

If the substrate 220, delivered to the printer 200 in portrait orientation, is determined, e.g., by the controller 270, to receive print material deposition only in the portrait orientation, no rotation of the substrate 220 is required. Print material is deposited, from the printhead assembly 119, which moves in the X direction, onto the substrate 220 while the substrate 220 is translated by the holder assembly 106 in the Y direction. At the end of the first translation of the substrate 220 in the Y direction, the print material deposition is completed, and the holder assembly 106, still holding the first edge 312 of the substrate 220, is moved in the Y direction back from the outfeed side to the infeed side. The substrate 220 with the print material deposited thereon is picked up, e.g., by a robot arm, from the infeed side of the table 102 for post-processing. Because the substrate was not rotated, the substrate 220 with the print material deposited thereon is still in the portrait orientation and ready to be handled by subsequent post-processing chambers and/or equipment which is/are generally configured to handle substrates in the portrait orientation.

If the substrate 220 is determined, e.g., by the controller 270, to receive at least some print material deposition in the landscape orientation, a rotation of the substrate 220 from the portrait orientation to the landscape orientation is performed. In an example where only print material deposition in the landscape orientation is to be performed, print material deposition is not yet performed during the first translation of the substrate 220 by the holder assembly 106 from the infeed side to the outfeed side. In another example where print material deposition in both the landscape orientation and the portrait orientation is to be performed, some print material deposition in the portrait orientation is performed during the first translation of the substrate 220 by the holder assembly 106 from the infeed side to the outfeed side. At the end of the first translation of the substrate 220, the substrate 220 reaches the state shown in FIG. 3A.

More specifically, as shown in FIG. 3A, the holder assembly 106 holds at least a partial length or substantially the entire length of the first edge 312, and delivers the substrate 220 to the end of the main section 262. In this case, the edge 323 of the substrate 220 is delivered by the holder assembly 106 to about the position of the edge 273 which is the boundary between the main section 262 and the second extension 266. The first actuator 230 and the auxiliary actuator 250 are controlled to move in the Y direction to align the end-effector 238 of the first actuator 230 and the end-effector 248 of the second actuator 240 with the corresponding first portion 221 and second portion 222 of the substrate 220. For example, a first rotational axis of the end-effector 238 is aligned, e.g., by moving the first actuator 230, to coincide with a first corner of the substrate 220 in the first portion 221, as described in more detail with respect to FIG. 4B. Similarly, a second rotational axis of the end-effector 248 is aligned, e.g., by moving the second actuator 240, to coincide with a second corner of the substrate 220 in the second portion 222. The coordinates of the corners of the substrate for the alignment may be determined from settings taught or entered by an operator into the printer 200. For example, when a substrate of a predetermined size is delivered to the printer 200 at a preset position on the infeed side of the table 102, the coordinates of the corners of the substrate on the infeed side are known from the preset position where the substrate is delivered and from the predetermined size of the substrate. From the known coordinates of the corners of the substrate on the infeed side, and a preset translation movement or distance of the holder assembly 106 holding the substrate, the coordinates of the corners of the substrate on the outfeed side are determinable. Additionally or alternatively, the coordinates of the corners of the substrate on the outfeed side may be detected by a camera using an image processing technique. In a further example, coordinates of a feature on the substrate having a predefined positional relationship to the corners of the substrate are determined, in addition to or in lieu of, coordinates of the corners of the substrate. Once the alignment of the end-effector 238 and end-effector 248 with the corresponding first portion 221 and second portion 222 of the substrate 220 has been completed, the end-effector 238 and end-effector 248 are controlled to engage with the corresponding first portion 221 and second portion 222 of the substrate 220, as described in more detail with respect to FIG. 4B. The holder assembly 106 is controlled to release the first edge 312 of the substrate 220, e.g., by stopping vacuum or suction force application to the holder assembly 106, effectively holding over the substrate 220 from the holder assembly 106 to the substrate handling mechanism 210.

As shown in FIG. 3B, the first actuator 230 and the auxiliary actuator 250 are next controlled to move or translate the substrate 220 and the second actuator 240 in the Y direction from the state in FIG. 3A toward the outfeed side to the state shown in FIG. 3B. The substrate rotating operation can now proceed.

As shown in FIG. 3C, the controller 270 is configured to control the first actuator 230 and the second actuator 240 to simultaneously move, in the Y direction and the X direction, respectively, to cause a rotation of the substrate 220, while the substrate 220 is being supported on the substrate support 260. During the rotation of the substrate 220, the first actuator 230 is linearly moved in the Y direction toward the second actuator 240 or toward the infeed end, for example, as shown by an arrow 351 in FIG. 3C. Simultaneously, the second actuator 240 is linearly moved in the X direction away from the first actuator 230 or away from the holder assembly 106, for example, as shown by an arrow 352 in FIG. 3C. During the simultaneous movements of the first actuator 230 and second actuator 240, the end-effector 238 and end-effector 248 are free to rotate together with the substrate 220 until the substrate 220 reaches the landscape orientation in FIG. 3D. In at least one embodiment, the substrate 220 is fully supported by the substrate support 260 at all stages of the substrate rotating operation. For example, at the beginning of the substrate rotating operation in FIG. 3B, the first portion 221 and a fourth portion 224 of the substrate 220 are supported by the main section 262, and the second portion 222 and third portion 223 of the substrate 220 are supported by the second extension 266. During the substrate rotating operation as exemplified in FIG. 3C, the first portion 221 of the substrate 220 is supported by the main section 262 and then by the second extension 266, the second portion 222 of the substrate 220 is supported by the second extension 266, the third portion 223 of the substrate 220 is supported by the second extension 266 then by the first extension 264 and finally by the main section 262, and the fourth portion 224 is supported by the main section 262. Upon completion of the substrate rotating operation in FIG. 3D, the first portion 221 and second portion 222 of the substrate 220 are supported by the second extension 266, and the third portion 223 and fourth portion 224 of the substrate 220 is supported by the main section 262. When the substrate 220 reaches the landscape orientation at FIG. 3D, the linear movements of the first actuator 230 and second actuator 240 are controlled to stop.

As shown in FIG. 3D, the substrate 220 is re-oriented to assume the landscape orientation at the end of the substrate rotating operation. Specifically, the first edge 312 of the substrate 220 is re-oriented in the X direction instead of the Y direction as in FIG. 3B. A second edge 341 of the substrate 220, which connects the first portion 221 and the fourth portion 224 of the substrate 220 and which was previously oriented in the X direction in FIG. 3B, is now re-oriented in the Y direction in FIG. 3D. The second edge 341 is aligned with at least some vacuum or suction holes of the holder assembly 106 and is ready to be held by the holder assembly 106. The described alignment of the rotational axes of the end-effector 238 and end-effector 248 to coincide with the corresponding corners of the substrate 220 results in the alignment of the second edge 341 of the substrate 220 along the Y direction and with the holder assembly 106, without requiring re-alignment following rotation.

As shown in FIG. 3E, at the end of the substrate rotating operation in FIG. 3D, the first actuator 230 and the auxiliary actuator 250 are controlled to move or translate the substrate 220 and the second actuator 240 in the Y direction toward the infeed side to a position in FIG. 3E where at least a partial length or substantially the entire length of the second edge 341 can be held by the holder assembly 106. Then, the holder assembly 106 is controlled to apply vacuum or suction force to hold a partial length or the entire length or substantially the entire length of the second edge 341 of the substrate 220. Thereafter, the end-effector 238 and end-effector 248 can be controlled to disengage from the corresponding first portion 221 and second portion 222 of the substrate 220, effectively holding over the rotated substrate 220 from the substrate handling mechanism 210 back to the holder assembly 106.

Next, the holder assembly 106 holding at least partially the second edge 341 translates the substrate 220, now in the landscape orientation, in the Y direction back toward the infeed side in a second translation of the substrate 220. The substrate 220, now in the landscape orientation, is translated by the holder assembly 106 in the Y direction toward the outfeed side again in a third translation of the substrate 220. During the third translation of the substrate 220, print material is deposited onto the substrate 220 which is in the landscape orientation as desired. At the end of the third translation, the substrate 220 with the print material deposited thereon is rotated by a reversed substrate rotating operation from the landscape orientation in FIG. 3D, through a variety of intermediate states as exemplified in FIG. 3C, back to the portrait orientation in FIG. 3B. The substrate 220 with the print material deposited thereon and in the portrait orientation is moved by the holder assembly 106 in a fourth translation along the Y direction back to the infeed side to be picked up, e.g., by a robot arm, for post-processing. Because the substrate 220, although having the print material deposited thereon when the substrate is in the landscape orientation as desired, is nevertheless discharged from the printer 200 in the portrait orientation, it is ready to be handled by subsequent post-processing chambers and/or equipment which is/are generally configured to handle substrates in the portrait orientation. Using a printer with in-situ rotation capability avoids the need for a separate chamber or equipment for rotating substrates.

The described configuration of the substrate handling mechanism 210 and its substrate rotating operation are examples, and other arrangements are within the scopes of various embodiments. In an example, although an edge 323 of the substrate 220 that connects the second portion 222 and third portion 223 is shown in FIGS. 3A-3B to coincide with an edge 274 of the second extension 266, it is possible to start the substrate rotating operation when the edge 323 is located, in the Y direction, between opposite edges 273 and 274 of the second extension 266. Here, the edge 273 extends in the X direction, is located on the infeed side of the second extension 266, and defines a boundary between the second extension 266 and the main section 262. The edge 274 is opposite to the edge 273 in the Y direction, extends in the X direction, and is located on the outfeed side of the second extension 266. Likewise, it is possible to complete the substrate rotating operation with the first edge 312 of the substrate 220 between opposite edges 273 and 274 of the second extension 266, instead of coinciding with the edge 274 of the second extension 266 as shown in FIGS. 3D-3E. Alternatively or additionally, the described movements of the first actuator 230 and auxiliary actuator 250 in unison before or after substrate rotation are to move the substrate 220 already held by the first actuator 230 and second actuator 240 to a position that can avoid obstacles during the substrate rotation.

In a further example, although it is described that the substrate 220 is delivered to the printer 200 in the portrait orientation, it is possible that the substrate 220 is delivered to the printer 200 in the landscape orientation. Likewise, although it is described that the substrate 220 is discharged from the printer 200 in the portrait orientation, it is possible that the substrate 220 is discharged from the printer 200 in the landscape orientation, provided that the post-processing chambers and/or equipment is/are configured to handle substrates in the landscape orientation. Further, the described multiple passes or translations of the substrate 220 in the Y direction are examples, and more or less passes in the Y direction are possible and/or print material deposition is possible in any one or more of the passes.

In yet another example, although the substrate handling mechanism 210 is described as being arranged on the outfeed side, it is possible to arrange the substrate handling mechanism 210 on the infeed side. In an example configuration, the first actuator 230 is still on the same side as the holder assembly 106 with respect to the table 102, but is arranged on the infeed side of the printer 200. The second actuator 240, auxiliary actuator 250 and substrate support 260 are also arranged on the infeed side. In this configuration, it is possible to rotate, if needed, a substrate as soon as the substrate is delivered at the infeed side of the printer 200.

In a further example, although the printer 200 is described as including the first actuator 230 and the holder assembly 106 on the same side of the substrate support 260, it is possible to arrange the first actuator 230 and the holder assembly 106 on opposite sides of the substrate support 260. Specifically, the first actuator 230 can be arranged adjacent to the first extension 264, and the arm 236 can extend in the X direction across the entire width of the second extension 266 and the main section 262 to engage the corresponding corner portion 221 of the substrate 220.

In another example, although the substrate handling mechanism 210 is described as rotating the substrate 220 counter-clockwise, it is possible to configure or control the substrate handling mechanism 210 to rotate the substrate 220 clockwise, i.e., in the opposite direction from the rotation direction shown in FIGS. 3B-3D. For example, the first actuator 230 and second actuator 240 can initially hold the substrate 220 in a state similar to FIG. 3D. Then, the first actuator 230 is controlled to move in the Y direction toward the infeed side, and at the same time, the second actuator 240 is controlled to move in the X direction toward the first actuator 230. As a result, the substrate 220 is rotated to the state shown in FIG. 3C, and then to the state shown in FIG. 3B.

Figure 4B:
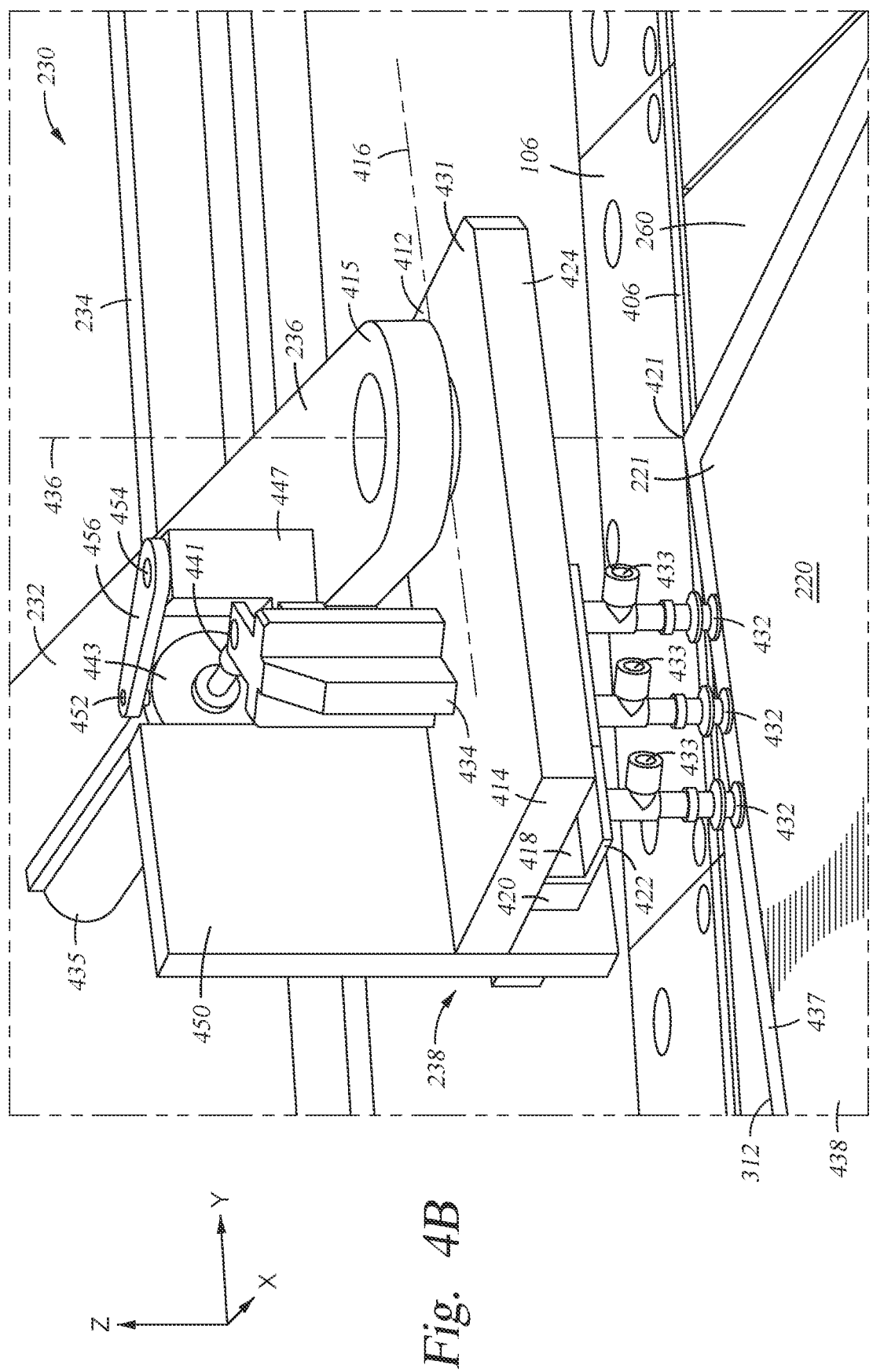
Figure 4C:
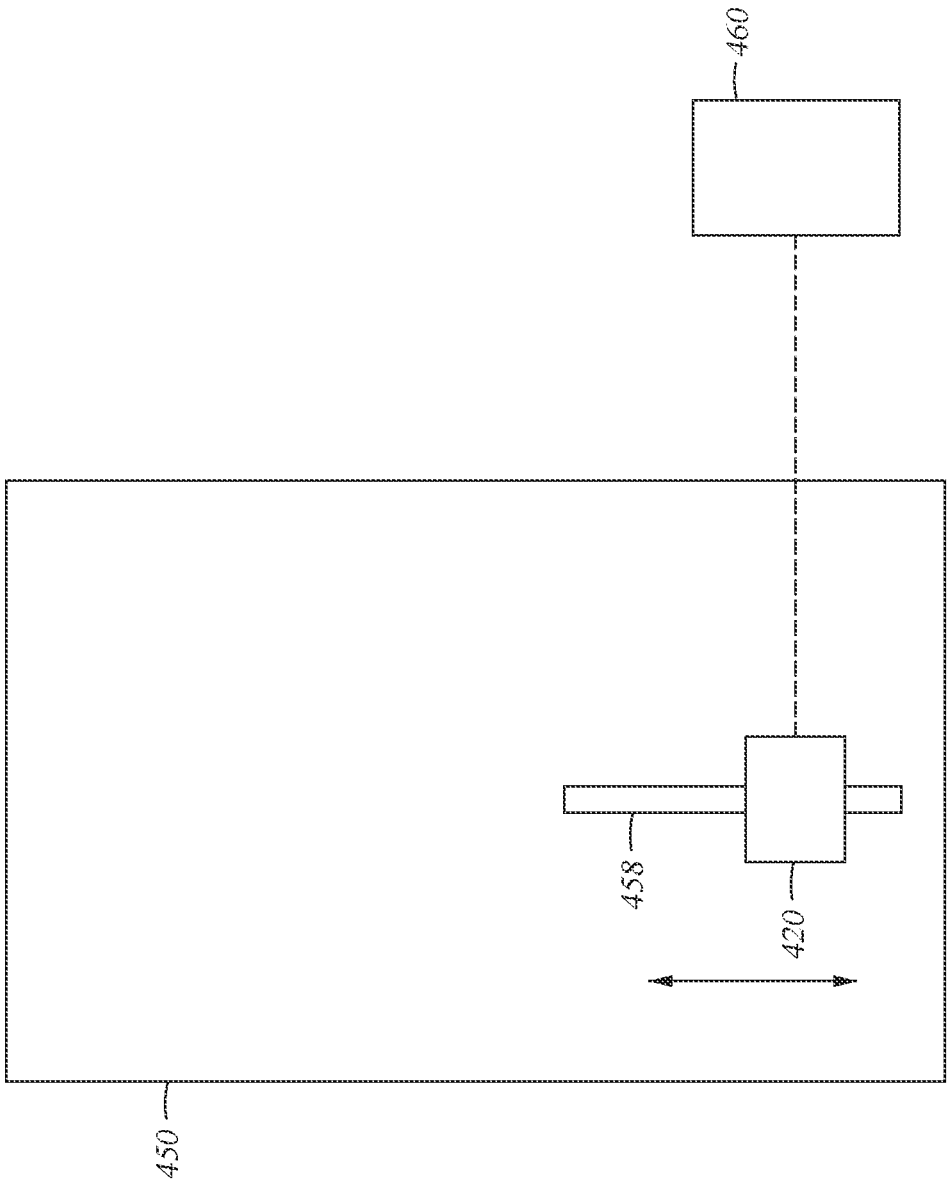
FIG. 4C is a schematic rear view, of various parts of a printer, in accordance with at least one embodiment.

FIGS. 4A and 4B are perspective views, and FIG. 4C is a schematic rear view, of various parts of the printer 200, in accordance with at least one embodiment.

FIG. 4A shows example configurations of the first actuator 230 and second actuator 240 in greater detail than FIGS. 2 and 3A-3E. Specifically, FIG. 4A shows that each of the first actuator 230 and second actuator 240 has a carriage 232, 242 coupled to and movable along a corresponding rail 234, 244, an arm 236, 246 extending from the carriage 232, 242 toward the substrate support 260, and an end-effector 238, 248 pivotably coupled to a distal end of the corresponding arm, 236, 246 and configured to hold the corresponding portion of the substrate 220. The arms 236 and 246 are elongated members that generally have larger length than width. A first or proximal end 411 of the arm 236 is attached to the carriage 232, and a first or proximal end 413 of the arm 246 is attached to the carriage 242. The arm 236 extends from the carriage 232 toward the substrate support 260 so a second or distal end 415 of the arm 236 is located over the substrate support 260 to access the first portion 221 of the substrate 220, when suitably positioned. The arm 246 extends from the carriage 242 toward the substrate support 260 so a second or distal end 417 of the arm 246 is located over the substrate support 260 to access the second portion 222 of the substrate 220, when suitably positioned. The second ends 415, 417 of the arms 236, 246 are displaced from the first ends 411, 413 along the length of each arm. Here, the two arms 236 and 246 extend in directions perpendicular to each other and to their respective rails 234 and 244, but the arms could extend at different angles if desired.

FIG. 4B shows an example configurations of the first actuator 230 in greater detail than FIG. 4A. Specifically, FIG. 4B shows that the end-effector 238 of the first actuator 230 comprises a base member 431 positioned to extend over the substrate support 260, and a plurality of suction cups 432. The base member 431 is pivotably coupled to the arm 236, at the second end 415 thereof, to be rotatable about a rotational axis 436. The rotational axis 436 is near the second end 415 at an operationally appropriate distance from the second end 415. In FIG. 4B, the substrate 220 is in a state between FIG. 3B and FIG. 3D, i.e., during a substrate rotating operation.

The base member 431 is coupled to the second end 415 of the arm 236 at a first end 412 of the base member 431. The suction cups 432 are attached to the base member 431 at a second end 414 of the base member 431. The suction cups 432 are aligned along a longitudinal axis 416 of the base member 431. The base member 431 is centrally coupled to the arm 236 such that the rotational axis 436 is disposed through longitudinal axis 416 of the base member 431. The rotational axis 436 could be spaced apart from the longitudinal axis 416 of the base member 431. The suction cups 432 are attached to a holder 418. The holder 418 is attached to a ridge 420 extending along the lower side of the base member 431 in the longitudinal direction of the base member 431. The holder 418 has an attachment portion 422 that extends away from the ridge 420 toward a long edge 424 of the base member 431. The suction cups 432 are attached to the attachment portion 422 of the holder 418, so the suction cups 432 are aligned with the longitudinal axis 416 but spaced apart from the longitudinal axis 416. The suction cups 432 are uniformly spaced along the longitudinal axis 416. The ridge 420 and holder 418 extend partway along the underside of the base member 431. An upright member 450 is attached to the other long edge (not numbered in FIG. 4B) of the base member 431 which is opposite the long edge 424 across the longitudinal axis 416. The ridge 420 and the holder 418 attached thereto are coupled to the upright member 450 to be movable along the Z direction, as described with respect to FIG. 4C.

FIG. 4C is a schematic rear view of the upright member 450. A front view of the upright member 450 is visible in FIG. 4B. In the example configuration in FIG. 4C, the upright member 450 has a slot 458 elongated in the Z direction. The ridge 420 has a portion of a reduced width (not shown) extending through the slot 458, and movable along the slot 458. The ridge 420 is coupled to an actuator 460, e.g., a motor or servomotor. The actuator 460 is controlled, e.g., by the controller 270, to move the ridge 420, as well as the holder 418 and suction cups 432 (best seen in FIG. 4B), up and down in the Z direction along the slot 458.

Returning to FIG. 4B, the suction cups 432 are arranged on the underside of the base member 431 to be offset from the rotational axis 436, and are configured to be lowerable toward and raisable away from the substrate support 260, e.g., by the actuator 460 via the ridge 420 and holder 418 as described with respect to FIG. 4C. The suction cups 432 have corresponding ports 433 for applying a suction force or vacuum to the suction cups 432 to cause the suction cups 432 to engage the corresponding portion of the substrate 220 before substrate rotation. Positive pressure can be applied through the ports 433 to cause the suction cups 432 to disengage from the corresponding portion of the substrate 220 after substrate rotation. A driving member 434 is arranged on an upper side of the base member 431, and is coupled to a rod 441 which is controllably extensible from and retractable into an end 443 of a cylinder 435. A first pivot 452 is arranged on a top side of the end 443 of the cylinder 435. A post 447 is arranged on an upper side of the arm 236. A second pivot 454 is arranged on a top side of the post 447. A bracket 456 is pivotably coupled between the first pivot 452 and the second pivot 454, thereby coupling the end 443 of the cylinder 435 and the post 447. The movement of the rod 441 into or from the cylinder 435 is controllable, e.g., by the controller 270. The second actuator 240 has similar configuration and/or operation to the first actuator 230, and the description of operation of the first actuator 230 hereinafter is applicable to the second actuator 240.

Before engagement of the suction cups 432 with a substrate 220 for a substrate rotating operation, the cylinder 435 is controlled to be pressurized, e.g., by a supply of pressurized air from a pressurized air source, and the rod 441 of the pressurized cylinder 435 pulls (or pushes) the base member 431 to a predetermined homing position where the suction cups 432 are arranged in the Y direction and directly over the edge 312 of the substrate 220 to be engaged with the suction cups 432. Besides the movement of the base member 431 and the suction cups 432 to the homing position, there is a further alignment of the first actuator 230 with the corresponding portion 221 of the substrate 220. The alignment of the first actuator 230 with the corresponding portion 221 of the substrate 220 can be performed based on the coordinates or positions of the corners of the substrate 220. The coordinates or positions of the corners of the substrate 220 can be determined from the settings of the printer 200, and/or detected by a camera using an image processing technique, as described with respect to FIG. 3A. Based on the detected coordinates or positions of the corners of the substrate 220, the rotational axis 436 is aligned, e.g., by controllably moving the carriage 232 along the rail 234 after the base member 431 and the suction cups 432 have been moved to the homing position, to coincide with the detected corner 421 of the substrate 220 at the first portion 221. As a result of the described movement of the base member 431 and the suction cups 432 to the homing position and the described alignment of the rotational axis 436 with the corner 421 of the substrate 220, the suction cups 432 are aligned with a peripheral, non-print region 437 along the edge 312 of the substrate 220. The non-print region 437 is where print material is not to be deposited, as opposed to a print region 438 of the substrate 220 where print material is to be deposited. The non-print region 437 extends along the periphery of the substrate 220, and around the print region 438. Sizes and/or positions of the non-print region 437 with respect to the corners of the substrate 220 are included in the settings of the printer 200 for each individual substrate 220 and/or for each print job. Upon completion of the alignment, the suction cups 432 are lowered toward the substrate support 260 and vacuum or suction force is applied to the ports 433 to cause engagement of the suction cups 432 with an upper surface of the substrate 220 along the non-print region 437. The engagement of the suction cups 432 with the non-print region 437 avoids or reduces damages to print features existing in or to be deposited on the print region 438. Prior to and during the engagement of the suction cups 432 with the non-print region 437, the holder assembly 106, holds the substrate 220 by vacuum or suction force applied, via holes 406 of the holder assembly 106, to a lower surface of the substrate 220. In an example configuration, the holes 406 are arranged in a region of a width of only a few millimeters along the longitudinal edge (in the Y direction) of the holder assembly 106. The non-print region 437 overlaps at least some of the holes 406 before and/or after a substrate rotating operation, e.g., when the substrate 220 is in a state as described with respect to one or more of FIGS. 3A, 3B, 3D, 3E. Upon completion of the engagement of the suction cups 432 of the first actuator 230 with the non-print region 437 and similar alignment and engagement of suction cups (not shown) of the second actuator 240 with corresponding portions (not shown) of the non-print region 437, the holder assembly 106 is controlled to release the substrate 220, by application of positive pressure to the holes 406. As a result, the substrate 220 is held over from the housing 110 to the substrate handling mechanism 210 in a state of FIG. 3A. The first actuator 230 and the auxiliary actuator 250 are then controlled to move the substrate 220 to a state of FIG. 3B. Then, the cylinder 435 is controlled to be depressurized, e.g., by cutting off the supply of the pressurized air, and the rod 441 of the depressurized cylinder 435 is permitted to move freely along the cylinder 435. As a result, the end-effector 238 is free to rotate together with the substrate 220 during a subsequent substrate rotating operation which is performed by simultaneously moving the first actuator 230 and second actuator 240 as described herein. Upon completion of the substrate rotating operation, e.g., in a state of FIG. 3E, the holder assembly 106 is controlled to engage with the substrate 220 along the second edge 341. Upon completion of the engagement of the holder assembly 106 with the second edge 341, vacuum or suction force application to the ports 433 is stopped (or positive pressure is applied to the ports 433) to release the suction cups 432 from the non-print region 437. Subsequently, the suction cups 432 are raised upward to disengage the end-effector 238 from the substrate 220 and to avoid interfering with subsequent movements of the substrate 220. A similar disengagement is performed between the suction cups (not shown) of the second actuator 240 with the corresponding portions (not shown) of the non-print region 437.

In the example configuration described with respect to FIG. 4B, by simply pressurizing the cylinder 435 to move the base member 431 and the suction cups 432 to a predetermined homing position, it is possible to easily place the suction cups 432 in alignment with an edge of a substrate to be engaged for a substrate rotating operation. Further, by simply depressurizing the cylinder 435 at the beginning of the substrate rotating operation, the end-effector 238 is permitted to freely rotate together with the substrate 220 during the substrate rotating operation. As a result, a simple yet effective arrangement for substrate rotation is achievable.

FIGS. 5A and 5B are elevational side views of the outfeed side of the printer 200, in accordance with at least one embodiment. FIG. 5A is an elevational side view looking in the Y direction, and FIG. 5B is an elevational side view looking in the X direction. In FIG. 5A, the rail 234 is attached to a support 534, and the rails 254A, 254B are attached to supports 554A, 554B, respectively. The supports 534, 554A, 554B have upper ends attached to the underside of the rails 234, 254A, 254B, respectively. Lower ends of the supports 534, 554A are attached to a mounting structure 555A, and a lower end of the mounting structure 554B is attached or secured to a mounting structure 555B. As best been in FIG. 5B, the mounting structure 555B is attached or secured to the base 108. The mounting structure 555A (not shown in FIG. 5B) is similarly attached or secured to the base 108. In FIG. 5A, the arm 236 of the first actuator 230 extends in the X direction from the carriage 232, over the holder assembly 106, to position the end-effector 238 over the substrate support 260 (not numbered in FIG. 5A). In FIG. 5B, the arm 246 of the second actuator 240 extends in the Y direction from the carriage 242, over the rail 254B and rail 254A (not shown in FIG. 5B), to position the end-effector 248 over the substrate support 260.

In the example configuration in FIGS. 5A and 5B, moving parts where the carriage 232 rides on the rail 234 and/or where the carriage 242 rides on the rail 244 and/or where the carriage 252 (not numbered in FIGS. 5A-5B) rides on the rail 254A are located outside of the footprint of the substrate 220 and below the upper surface of the substrate support 260 on which the substrate 220 is supported by a gas cushion. As a result, it is possible in at least one embodiment to minimize the likelihood that particles generated by the moving parts might impinge on the surface of the substrate 220.

As described herein, by providing a substrate handling mechanism in a printer, it is possible to rotate a substrate in situ, without requiring a separate chamber or equipment for substrate rotation. This capability reduces total processing time and eliminates the cost and floor space of a separate rotation chamber and/or equipment.

Figure 6:
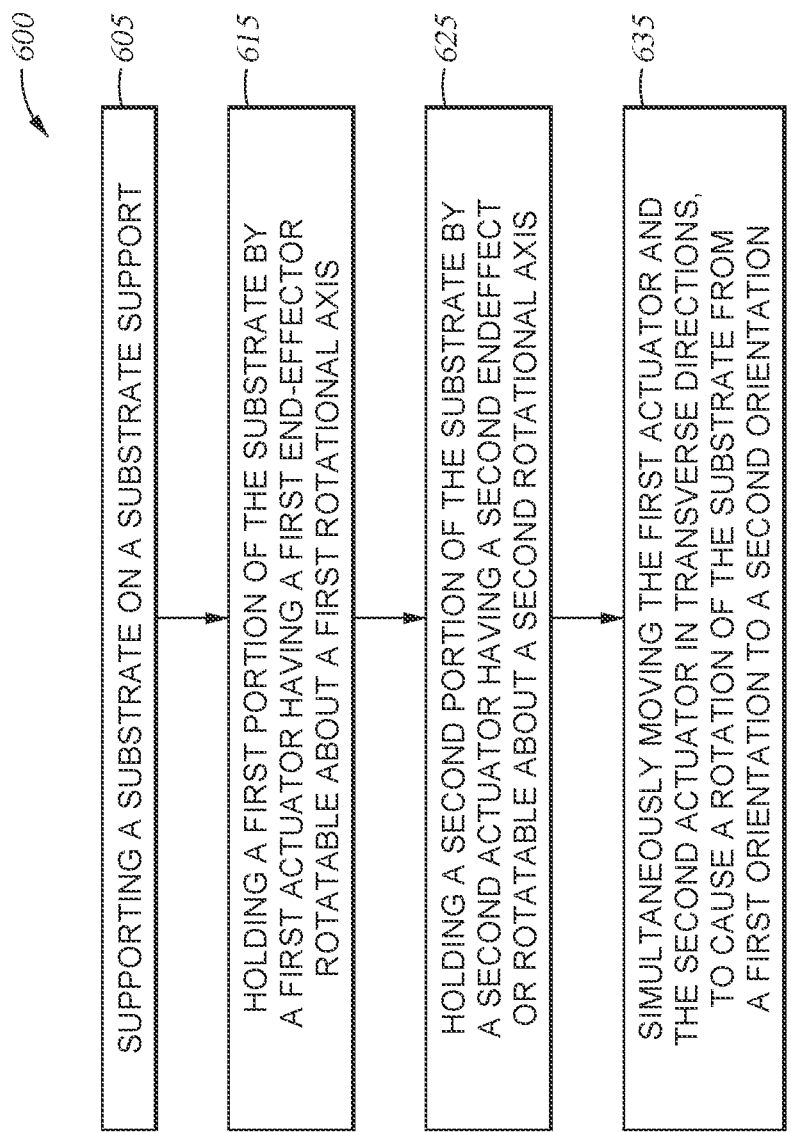
FIG. 6 is a flowchart of a method of handling a substrate in a printer, in accordance with at least one embodiment.

FIG. 6 is a flowchart of a method 600 of handling a substrate in a printer, in accordance with at least one embodiment. The method 600 may be performed in any of the printing systems 100, 200 by, or under control of, at least one controller as described herein.

At operation 605, a substrate is supported on a substrate support. For example, as described with respect to FIG. 3B, a substrate 220 is supported on a substrate support 260 of a substrate handling mechanism 210 in a printer 200.

At operation 615, a first portion of the substrate is held by a first end-effector of a first actuator, and the first end-effector is rotatable about a first rotational axis. For example, as described with respect to FIGS. 2, 3A, 3B, 4A and 4B, a first portion 221 of the substrate 220 is held by an end-effector 238 of a first actuator 230 of the substrate handling mechanism 210. The end-effector 238 is rotatable about a first rotational axis 436 with respect to an arm 236 of the first actuator 230. In an example, the rotational axis 436 is aligned with a corner 421 of the substrate 220.

At operation 625, a second portion of the substrate is held by a second end-effector of a second actuator, and the second end-effector is rotatable about a second rotational axis. For example, as described with respect to FIGS. 2, 2A, 3A, 3B and 4A, a second portion 222 of the substrate 220 is held by an end-effector 248 of a second actuator 240 of the substrate handling mechanism 210. The end-effector 248 is rotatable about a second rotational axis with respect to an arm 246 of the second actuator 240, and, in an example, the second rotational axis of the end-effector 248 is aligned with a second corner of the substrate 220, in a manner similar to that described with respect to the first actuator 230.

At operation 635, the first actuator and the second actuator are simultaneously moved respectively in a first direction and in a second direction transverse to the first direction, to cause a rotation of the substrate from a first orientation to a second orientation. For example, as described with respect to FIG. 3C, the first actuator 230 and the second actuator 240 are simultaneously moved in the Y direction and X direction, respectively, to cause a rotation of the substrate 220 from the portrait orientation in FIG. 3B to the landscape orientation in FIG. 3D. As a result, in situ rotation of substrates in the printer 200 is achievable, with one or more advantages as described herein.

In at least one embodiment, printed products manufactured by the described method and/or printer include, but are not limited to, solar panels, and flat panel displays such as organic light emitting diode (OLED) displays.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

FIG. 7 is a block diagram of a controller, in accordance with at least one embodiment. One or more of the units and/or systems and/or operations described with respect to FIGS. 1-6 is/are realized in at least one embodiment by one or more controllers 700 of FIG. 7.

The controller 700 comprises a hardware processor 702, a storage device 704 including at least one non-transitory, computer readable storage medium, a bus 708, an I/O (input/output) interface 710, and a network interface 712. The processor 702 is coupled with the storage device 704, the I/O interface 710, and the network interface 712 via the bus 708. The network interface 712 is connectable to a network 714, so that the processor 702 and the storage device 704 are communicable with other devices via the network 714. The processor 702 is configured to execute computer program instructions encoded in the storage device 704 and/or to access data stored in the storage device 704 to cause the controller 700 to perform one or more functionalities and/or operations described with respect to FIGS. 1-6.

The processor 702 includes one or more of a central processing unit (CPU), a multi-processor, a distributed processing system, an application specific integrated circuit (ASIC), and/or a suitable hardware processing unit.

The storage device 704 includes one or more of an electronic, magnetic, optical, electromagnetic, infrared, and/or a semiconductor system (or apparatus or device) for storing instructions and/or data in a non-transitory manner. For example, the storage device 704 includes a semiconductor or solid-state memory, a magnetic tape, a removable computer diskette, a random access memory (RAM), a read-only memory (ROM), a rigid magnetic disk, and/or an optical disk. As examples of optical disks, storage device 704 includes a compact disk-read only memory (CD-ROM), a compact disk-read/write (CD-R/W), and/or a digital video disc (DVD).

The I/O interface 710 is circuitry that is connectable with external circuitry. For example, the I/O interface 710 includes one or more of a keyboard, keypad, mouse, trackball, trackpad, cursor direction keys, card reader, communication port, display, signal light, printer and/or audio device for communicating information to/from the processor 702. In an example, the I/O interface 710 is omitted.

The network interface 712 is circuitry that allows the controller 700 to communicate with the network 714, to which one or more other controllers and/or image capturing/processing equipment are connected. For example, the network interface 712 includes one or more of wireless network interfaces such as BLUETOOTH, WIFI, WIMAX, GPRS, or WCDMA; or wired network interface such as ETHERNET, USB, or IEEE-1394. In an example, the network interface 712 is omitted.

By being configured to execute some or all of functionalities and/or operations described with respect to FIGS. 1-6, the controller 700 enables the realization of one or more advantages and/or effects described with respect to FIGS. 1-6.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A printer, comprising:
a gas cushion substrate support to support a substrate above a surface of the substrate support;
a printhead assembly to deposit material on a substrate supported on the substrate support; and
a substrate handling mechanism to rotate a substrate disposed on the substrate support from a first orientation to a second orientation.

2. The printer of claim 1, wherein the substrate handling mechanism comprises a first actuator and a second actuator, the first and second actuators configured to simultaneously engage with the substrate and to move in perpendicular linear directions.

3. The printer of claim 2, wherein the substrate handling mechanism further comprises at least one auxiliary actuator to position the second actuator to engage with the substrate.

4. The printer of claim 2, wherein
at least one of the first actuator or the second actuator comprises:
a movable carriage,
an arm extending from the carriage toward the substrate support, and
an end-effector pivotably coupled to an end of the arm to hold a corresponding first or second portion of the substrate during rotation thereof, and to rotate together with the substrate.

5. The printer of claim 4, further comprising:
a holder assembly movable along the side of the substrate support to hold and translate a substrate while the substrate is being supported on the substrate support, wherein
the end-effector comprises a suction cup to engage an upper surface of a substrate during rotation, and
the holder assembly comprises a plurality of suction holes to engage a lower surface of a substrate during translation.

6. The printer of claim 4, wherein
the end-effector comprises a suction cup,
the suction cup is raisable away from the substrate support to disengage from a substrate during translation of the substrate by the holder assembly, and
the suction cup is lowerable toward the substrate support to engage the substrate during rotation of the substrate.

7. The printer of claim 2, wherein the first actuator is movable on a first track, the second actuator is movable on a second track perpendicular to the first track, and at least one of the first track or the second track is arranged below an upper surface of the substrate support.

8. The printer of claim 1, further comprising:
a holder assembly movable along the side of the substrate support in the first direction to hold and translate a substrate in the first direction while the substrate is being supported on the substrate support,
wherein the printhead assembly is movable relative to the substrate support in the second direction.

9. The printer of claim 1, wherein the substrate handling mechanism comprises a first actuator configured to engage with the substrate and to move in a first direction and a second actuator configured to engage with the substrate and to move in a second direction perpendicular to the first direction, and the substrate support comprises:
a rectangular main section,
a first extension adjacent, in the second direction, to the main section to support a first corner portion of the substrate during substrate rotation, and
a second extension adjacent, in the first direction, to the main section to support a second corner portion of the substrate during substrate rotation, wherein the main section and the first and second extension sections all provide gas cushion substrate support.

10. A method of handling a substrate in a printer, the method comprising:

supporting the substrate on a gas cushion substrate support; and rotating the substrate on the substrate support by simultaneously moving a first portion of the substrate in a first direction and a second portion of the substrate in a second direction transverse to the first direction using two independent actuators.

11. The method of claim 10, wherein each of the two independent actuators has a rotatable end-effector to engage with the substrate.

12. The method of claim 11, wherein each of the two independent actuators is configured to engage with the substrate at a corner thereof such that the rotational axis of each end-effector coincides with the respective corner of the substrate.

13. The method of claim 10, wherein
the substrate support comprises:
a rectangular main section, and
a first extension adjacent, in the second direction, to the main section,
the main section and the extension both provide a gas cushion,
during the rotation of the substrate, the first extension supports a third portion of the substrate,
the first portion of the substrate includes a first corner of the substrate,
the second portion of the substrate includes a second corner of the substrate, and
the third portion of the substrate includes a third corner of the substrate.

14. The method of claim 13, wherein
the substrate support further comprises:
a second extension adjacent, in the first direction, to the main section,
the second extension provides a gas cushion,
at a start of the rotation of the substrate,
the first portion of the substrate is supported by the main section, and
the second and third portions of the substrate are supported by the second extension,
during the rotation of the substrate,
the first portion of the substrate is supported by the main section and then by the second extension,
the second portion of the substrate is supported by the second extension, and
the third portion of the substrate is supported by the second extension and then by the first extension, and
upon completion of the rotation of the substrate,
the first and second portions of the substrate are supported by the second extension, and
the third portion of the substrate is supported by the main section.

15. The method of claim 10, further comprising:
engaging the substrate using a holder assembly and using one of the independent actuators to position the substrate to engage with the holder assembly.

16. The method of claim 10, further comprising:
at least one of before or after the rotation of the substrate, holding the substrate, by a holder assembly of the printer, at a plurality of locations along an edge of the substrate, and
translating the substrate using the holder assembly.

17. The method of claim 10, further comprising:
using a holder assembly of the printer to hold the substrate in a first orientation at a plurality of first locations along a first edge of the substrate;
moving the holder assembly holding the first edge of the substrate toward the actuators to cause a first translation of the substrate;
while the holder assembly is engaged with the substrate, engaging the actuators with the substrate;
after engaging the actuators with the substrate, disengaging the holder assembly from the substrate and performing the rotation of the substrate;
upon completion of the rotation of the substrate, using the holder assembly to hold the substrate in a second orientation at a plurality of second locations along a second edge of the substrate; and
moving the holder assembly holding the second edge of the substrate away from the actuators to cause a second translation of the substrate.

18. A substrate handling mechanism for a printer, the substrate handling mechanism comprising:
a first actuator positioned along a side of a gas cushion substrate support;
a second actuator positioned along an end of the gas cushion substrate support; and
a controller coupled to the first actuator and the second actuator to control the first actuator and the second actuator to simultaneously move along the substrate support in perpendicular direction,
wherein
each of the first actuator or the second actuator comprises:
a movable carriage,
an arm extending from the carriage toward the substrate support, and
an end-effector pivotably coupled to an end of the arm to be freely rotatable during the simultaneous movement of the first actuator and the second actuator.

19. The substrate handling mechanism of claim 18, wherein
each of the first and second actuators is coupled to a track by the respective movable carriages, and at least one of the tracks is arranged below an upper surface of the substrate support,
the end-effector is lowerable toward the substrate support, and
the end-effector is raisable away from the substrate support.

20. The substrate handling mechanism of claim 18, wherein the gas cushion substrate support comprises:
a first extension adjacent, in a first direction, to a rectangular main section of the substrate support, and
a second extension adjacent, in a second direction, to the main section, wherein the main section and the first and second extensions provide a gas cushion.

\* \* \* \* \*